US008566541B2

(12) United States Patent
Choi et al.

(10) Patent No.: US 8,566,541 B2
(45) Date of Patent: Oct. 22, 2013

(54) STORAGE SYSTEM STORING ELECTRONIC MODULES APPLIED TO ELECTRONIC OBJECTS COMMON TO SEVERAL COMPUTERS, AND STORAGE CONTROL METHOD FOR THE SAME

(75) Inventors: Jin Choi, Odawara (JP); Ikuya Yagisawa, Machida (JP); Koji Nagata, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 406 days.

(21) Appl. No.: 12/935,886

(22) PCT Filed: Aug. 14, 2010

(86) PCT No.: PCT/JP2010/005595
§ 371 (c)(1),
(2), (4) Date: Sep. 30, 2010

(87) PCT Pub. No.: WO2012/035576
PCT Pub. Date: Mar. 22, 2012

(65) Prior Publication Data
US 2012/0066466 A1  Mar. 15, 2012

(51) Int. Cl.
*G06F 12/00* (2006.01)
(52) U.S. Cl.
USPC ............. 711/162; 711/E12.002; 711/E12.103
(58) Field of Classification Search
USPC ........................... 711/162, E12.002, E12.103
See application file for complete search history.

(56) References Cited

U.S. PATENT DOCUMENTS

| 2004/0068637 | A1  | 4/2004 | Nelson et al. |
| 2009/0125680 | A1* | 5/2009 | Ninose et al. ................. 711/114 |
| 2010/0106688 | A1  | 4/2010 | Higuchi et al. |
| 2010/0250908 | A1  | 9/2010 | Amann et al. |

FOREIGN PATENT DOCUMENTS

| EP | 1 832 976 A1 | 9/2007 |
| JP | 2010-102479 | 5/2010 |

OTHER PUBLICATIONS

PCT International Search Report and Written Opinion on application No. PCT/JP2010/005595 dated Sep. 7, 2011; 12 pages.

* cited by examiner

*Primary Examiner* — Reginald Bragdon
*Assistant Examiner* — Mehdi Namazi
(74) *Attorney, Agent, or Firm* — Foley & Lardner LLP

(57) ABSTRACT

This storage system supplies, to a plurality of computers, a plurality of duplicate volumes (CVOLs) (corresponding to duplicates of a master volume (MVOL) upon which is stored an electronic object (EO) that is common to the plurality of computers). Both the MVOL and the CVOLS are virtual logical volumes that follow sync provisioning. In the plurality of CVOLs, a plurality of physical regions that are allocated to the MVOL (i.e. regions in which the electronic object is stored) (PAs) are allocated. A storage, when writing an electronic module (EM) to which the EO is applied to the first CVOL, copies data within a first PA that is allocated to the virtual region (VA) that is the write destination to a second PA, writes the EM to the second PA, and moreover allocates the second PA to a VA of the write destination, instead of the first PA. And the storage allocates the second PA to a VA within the second CVOL corresponding to the VA of the write destination, instead of the PA that is allocated to that VA.

11 Claims, 21 Drawing Sheets

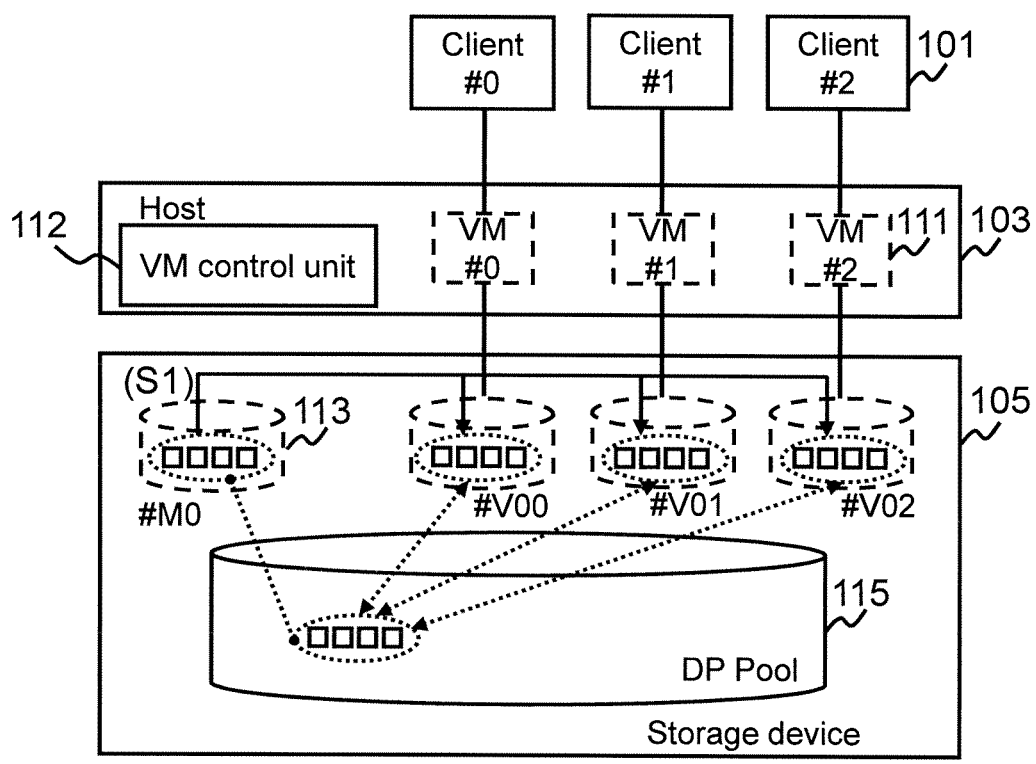

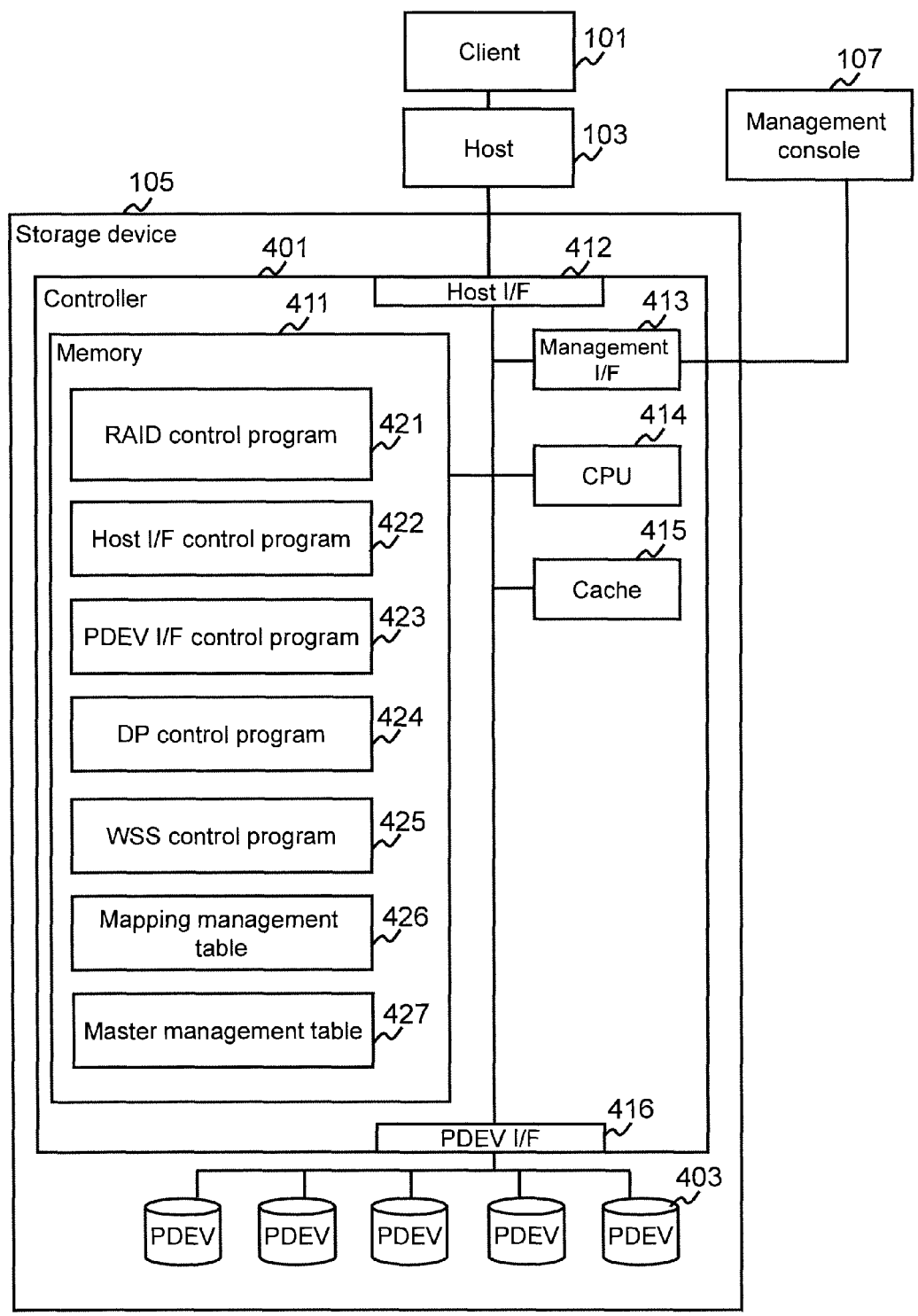

Fig. 5

| Volume number | Virtual address | Directly preceding physical address | Current physical address | Area attribute |
|---|---|---|---|---|
| M0 | M000 | NULL | P000 | OS Image |
|  | M001 | NULL | P001 |  |
|  | M002 | NULL | P002 |  |
|  | ⋮ | ⋮ | ⋮ |  |
|  | M007 | NULL | P007 |  |
| V0 | V000 | NULL | P000 | OS Image |
|  | V001 | NULL | P001 |  |
|  | V002 | NULL | P002 |  |
|  | ⋮ | ⋮ | ⋮ |  |
|  | V007 | NULL | P007 |  |
|  | V008 | NULL | Q100 | User data |
|  | ⋮ | ⋮ | ⋮ |  |
|  | V0xx | NULL | Q1xx |  |
| V1 | V100 | NULL | P000 | OS Image |
|  | V101 | NULL | P001 |  |
|  | V102 | NULL | P002 |  |
|  | ⋮ | ⋮ | ⋮ |  |
|  | V107 | NULL | P007 |  |
|  | V108 | NULL | R100 | User data |
|  | ⋮ | ⋮ | ⋮ |  |
|  | V1xx | NULL | R1xx |  |
| V2 | V200 | NULL | P000 | OS Image |
|  | V201 | NULL | P001 |  |
|  | V202 | NULL | P002 |  |
|  | ⋮ | ⋮ | ⋮ |  |
|  | V207 | NULL | P007 |  |
|  | V208 | NULL | S100 | User data |
|  | ⋮ | ⋮ | ⋮ |  |
|  | V2xx | NULL | S1xx |  |

Fig. 6

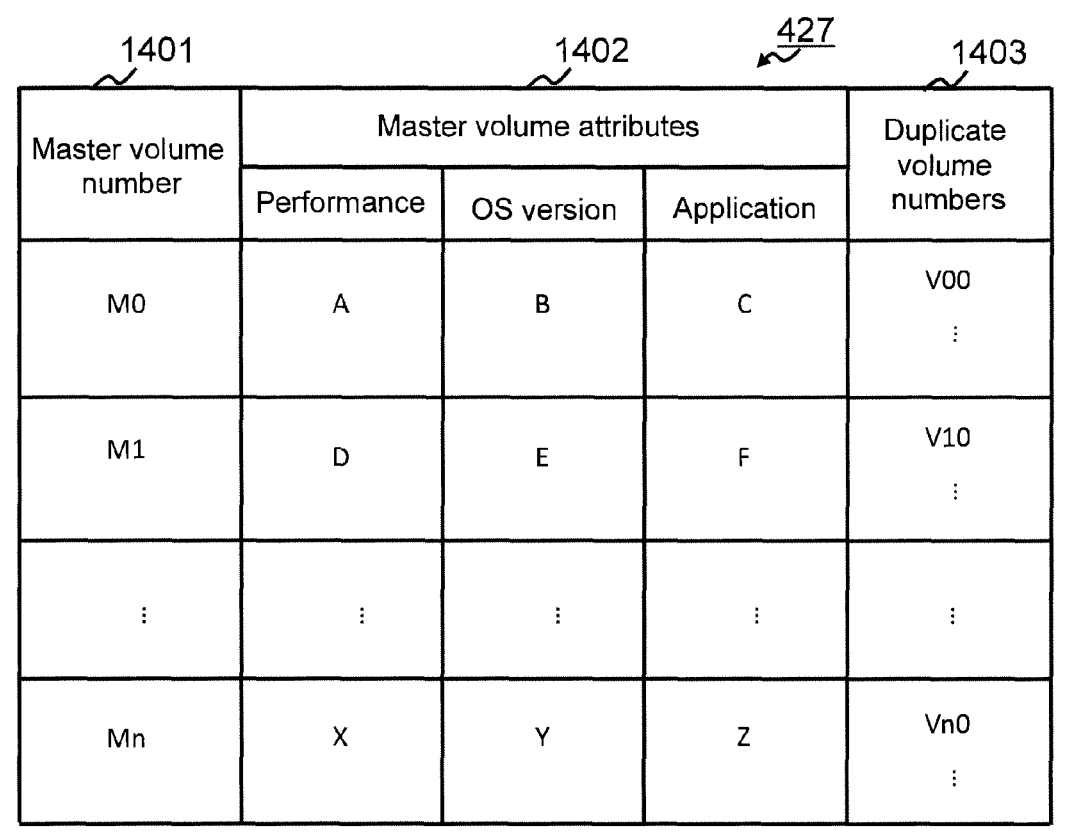

| Master volume number (1401) | Master volume attributes (1402) | | | Duplicate volume numbers (1403) |
|---|---|---|---|---|
| | Performance | OS version | Application | |
| M0 | A | B | C | V00 ⋮ |
| M1 | D | E | F | V10 ⋮ |
| ⋮ | ⋮ | ⋮ | ⋮ | ⋮ |
| Mn | X | Y | Z | Vn0 ⋮ |

Fig. 9

| Volume number | Virtual address | Directly preceding physical address | Current physical address | Area attribute |
|---|---|---|---|---|
| M0 | M000 | NULL | P000 | OS Image |
| | M001 | NULL | P001 | |
| | M002 | NULL | P002 | |
| | : | : | : | |
| | M007 | NULL | P007 | |
| V0 | V000 | NULL→P000 | P000→A000 | OS Image |
| | V001 | NULL→P001 | P001→A001 | |
| | V002 | NULL→P002 | P002→A002 | |
| | : | : | : | |
| | V007 | NULL | P007 | |
| | V008 | NULL | Q100 | User data |
| | : | : | : | |
| | V0xx | NULL | Q1xx | |
| V1 | V100 | NULL | P000 | OS Image |
| | V101 | NULL | P001 | |
| | V102 | NULL | P002 | |
| | : | : | : | |
| | V107 | NULL | P007 | |
| | V108 | NULL | R100 | User data |
| | : | : | : | |
| | V1xx | NULL | R1xx | |
| V2 | V200 | NULL | P000 | OS Image |
| | V201 | NULL | P001 | |
| | V202 | NULL | P002 | |
| | : | : | : | |
| | V207 | NULL | P007 | |
| | V208 | NULL | S100 | User data |
| | : | : | : | |
| | V2xx | NULL | S1xx | |

(V000–V002 rows: Updated)

Fig. 10

| Volume number | Virtual address | Directly preceding physical address | Current physical address | Area attribute | |
|---|---|---|---|---|---|
| M0 | M000 | NULL→P000 | P000→A000 | OS Image | Upda-ted |
| | M001 | NULL→P001 | P001→A001 | | |
| | M002 | NULL→P002 | P002→A002 | | |
| | ⋮ | ⋮ | ⋮ | | |
| | M007 | NULL | P007 | | |
| V0 | V000 | P000 | A000 | OS Image | |
| | V001 | P001 | A001 | | |
| | V002 | P002 | A002 | | |
| | ⋮ | ⋮ | ⋮ | | |
| | V007 | NULL | P007 | | |
| | V008 | NULL | Q100 | User data | |
| | ⋮ | ⋮ | ⋮ | | |
| | V0xx | NULL | Q1xx | | |
| V1 | V100 | NULL→P000 | P000→A000 | OS Image | Upda-ted |
| | V101 | NULL→P001 | P001→A001 | | |
| | V102 | NULL→P002 | P002→A002 | | |
| | ⋮ | ⋮ | ⋮ | | |
| | V107 | NULL | P007 | | |
| | V108 | NULL | R100 | User data | |
| | ⋮ | ⋮ | ⋮ | | |
| | V1xx | NULL | R1xx | | |
| V2 | V200 | NULL | P000 | OS Image | No change |
| | V201 | NULL | P001 | | |
| | V202 | NULL | P002 | | |
| | ⋮ | ⋮ | ⋮ | | |
| | V207 | NULL | P007 | | |
| | V208 | NULL | S100 | User data | |
| | ⋮ | ⋮ | ⋮ | | |
| | V2xx | NULL | S1xx | | |

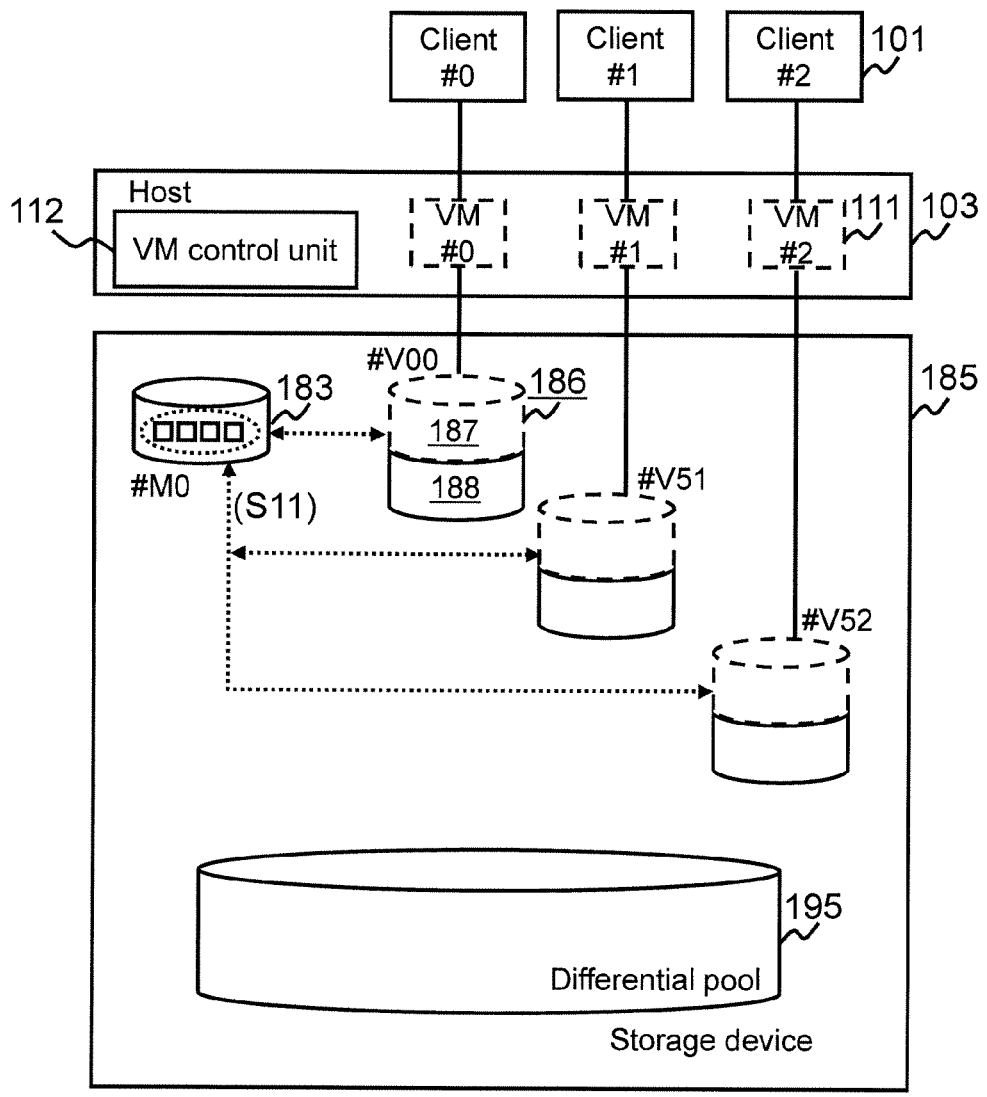

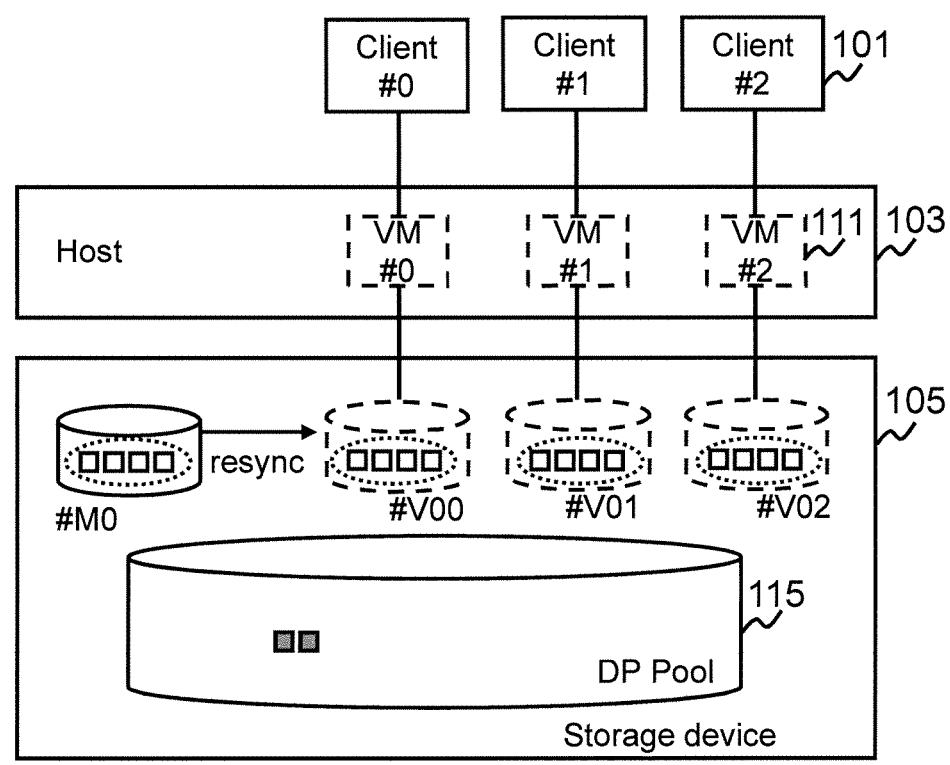

STORAGE SYSTEM STORING ELECTRONIC MODULES APPLIED TO ELECTRONIC OBJECTS COMMON TO SEVERAL COMPUTERS, AND STORAGE CONTROL METHOD FOR THE SAME

TECHNICAL FIELD

The present invention relates to a technique for controlling storage of electronic modules applied to electronic objects that are common to a plurality of computers.

BACKGROUND ART

A technique is known for creating a snapshot (hereinafter termed a "snapshot volume") of a logical volume (hereinafter termed an "original volume") in which original data is stored (refer to PTL 1). According to PTL 1, data that is stored in a snapshot volume (in other words, data that is differential with respect to a snapshot) is stored in a logical volume in which differential data is stored (hereinafter termed the "differential pool").

CITATION LIST

Patent Literature

[PTL 1] Japanese Laid Open Patent Publication 2010-102479

SUMMARY OF INVENTION

Technical Problem

It will be supposed that a plurality of snapshot volumes are created for a single original volume, and that those snapshot volumes are supplied to a plurality of virtual machines. And it will be supposed that the original volume stores a guest OS (operating system) of a virtual machine. In this type of environment, each of the virtual machines acquires a guest OS from a snapshot volume that is supplied to that virtual machine, and executes that guest OS.

In this type of environment, if a patch is applied to a guest OS, this patch comes to be written into the snapshot volume that is supplied to that virtual machine. This patch that is written is actually stored in a differential pool.

Accordingly, if the same patch is applied to the guest OSs of a plurality of virtual machines, then a plurality of copies of the same patch come to be stored in the differential pool. Due to this, some of the capacity of the differential pool is consumed uselessly, and this is undesirable.

This problem can also occur in at least one of these cases: (1) if the computer is a computer other than a virtual machine; (2) if the electronic object that is common to a plurality of computers is some object other than an OS (for example, if it is an application program or a data file); (3) if an electronic module that is applied to electronic objects is something other than a patch (for example, if it is data).

Thus, an object of the present invention is to reduce the storage capacity consumed by a storage system on which are stored electronic modules applied to electronic objects that are common to a plurality of computers.

Solution to Problem

According to a first standpoint, sync provisioning is employed. The storage system supplies, to a plurality of computers, a plurality of duplicate volumes (corresponding to duplicates of a master volume upon which is stored an electronic object that is common to the plurality of computers). A first duplicate volume is supplied to the first computer, and a second duplicate volume is supplied to the second computer. Both the master volume and the duplicate volumes are virtual logical volumes that follow sync provisioning. In the plurality of duplicate volumes, a plurality of physical regions that are allocated to the master volume (i.e. regions in which that electronic object is stored) are allocated. A storage, when writing an electronic module to which the electronic object is applied to the first duplicate volume, copies data within the first physical region that is allocated to the virtual region that is the write destination to the second physical region, writes the electronic module to the second physical region, and moreover allocates the second region to a virtual region in said write destination, instead of the first physical region. And the storage allocates the second physical region to a virtual region within the second duplicate volume corresponding to the virtual region of the write destination, instead of the physical region that is allocated to that virtual region.

According to a second standpoint, a master volume is a logical volume (an actual volume) based upon a plurality of physical storage devices. And duplicate volumes are virtual logical volumes corresponding to snapshots of the master volume. Each logic region making up each duplicate volume corresponds to a physical region that makes up the master volume. A storage, when writing an electronic module that is applied to an electronic object to a first duplicate volume, writes the electronic module to a physical region within a pool, and allocates the physical region in which the electronic region is written to a logic region of the write destination, instead of to the physical region within said master volume corresponding to this logic region. And the storage copies at least the electronic module from the first duplicate volume to the master volume, and writes updated data in the master volume (i.e. the data that is stored in the logic region in which the electronic module is written) from the master volume to the pool. Moreover, the storage considers the second duplicate volume as a duplicate of the master volume after updating has been performed.

BRIEF DESCRIPTION OF DRAWINGS

FIG. 1 shows a summary according to a first embodiment of the present invention.

FIG. 4 shows the structure of a computer system in which a storage device 105 according to the first embodiment is included.

FIG. 5 shows the structure of a mapping management table 426 according to the first embodiment.

FIG. 6 shows the structure of a master management table 427.

FIG. 9 shows updating of the mapping management table 426 by a step S804 of FIG. 8.

FIG. 10 shows updating of the mapping management table 426 by steps S807 and S809 of FIG. 8.

FIG. 17 shows a summary according to a second embodiment of the present invention.

FIG. 21 shows recovery processing according to the second embodiment.

DESCRIPTION OF EMBODIMENTS

Figure 2A:
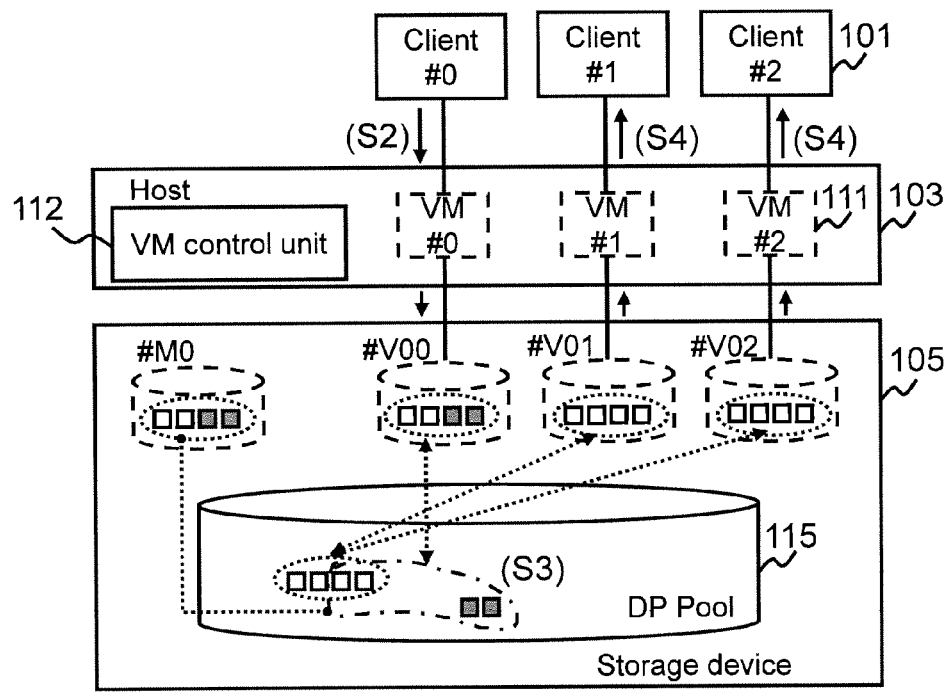
FIG. 2A shows a portion of a processing summary performed in the first embodiment.

In the following, several embodiments of the present invention will be explained with reference to the drawings.

It should be understood that while, in the following explanation, the computer is a virtual machine, it would also be acceptable for the computer to be some computer other than a virtual machine, for example a physical computer.

Furthermore while, in the following explanation, the electronic object that is in common to a plurality of computers is an operating system (i.e. an OS), it would also be acceptable for this electronic object to be some object other than an OS, for example an application program or a data file.

Moreover while, in the following explanation, the electronic module that is applied to the electronic object is a patch, it would also be acceptable for this module to be something other than a patch, for example data.

And while, in the following explanation, the storage system is made up from a single storage device, it would also be acceptable for it to be made up from a plurality of storage devices.

Further while, in the following explanation, in some cases, various types of information are explained using the expressions "xxx table" or "xxx list", these various types of information could also be embodied in data structures other than tables and lists. Thus, "xxx table" or "xxx list" may be expressed as "xxx information", in order to show that they do not depend upon any particular data structure.

Yet further while, in the following explanation, numbers are used as identification information for various subjects, it would also be possible to employ identification information of some type other than numbers (for example, identifiers that include letters or symbols).

Even further while, in the following explanation, in some cases, the processing is explained while employing a "program" as the grammatical subject, the grammatical subject that performs the processing may also be the processor, since this program is executed by a processor (for example a CPU (Central Processing Unit)) which performs the specified processing while appropriately using resources (for example, memory) and/or communication interface devices (for example, communication ports). Processing that is explained by employing a program as the grammatical subject may also be processing that is performed by a storage device or by a controller. Furthermore, the program may also be installed upon several computers from a program source. For example, this program source may be a program distribution server or a storage medium.

Still further when, in the following explanation, a subject P is denoted by a number that is "xx", in some cases it may be expressed as "P #xx". For example, the logical volume whose volume number is 01 is sometimes described as "logical volume #01".

Embodiment #1

FIG. 1 shows a summary according to a first embodiment of the present invention.

A host device 103 (hereinafter termed a "host") is coupled to a storage device 105 via a dedicated line or via a communication network. And a plurality of client devices 101 (hereinafter termed "clients") are coupled to the host 103 via a communication network.

The host 103 is, for example, a computer, and has physical resources including a first communication interface to the clients 101, a second communication interface to the storage device 105, a storage resource, and a processor coupled to the above elements. A plurality of virtual machines 111 (hereinafter termed "VM"s) are created on the basis of these physical resources. The host 103 includes a function 112 (a VM control unit) of dynamically starting and ending VMs. This VM control unit 112, for example, may be a hypervisor (not shown in the drawings).

Each of the VMs 111 executes a guest OS (operating system). One or more of the clients 101 is coupled to each of the VMs. A VM 111 can function as a server. Due to this, while the host 103 is a physical server, a VM may be a virtual server.

The storage device 105 holds a plurality of virtual volumes 113 and a DP (dynamic provisioning) pool 115.

A virtual volume 113 is a virtual logical volume that obeys dynamic provisioning (also termed "sync provisioning"). One of these virtual volumes 113 consists of a plurality of virtual pages. A virtual page is a virtual storage region. A virtual address (for example, a LBA (Logical Block Address)) is allocated to each virtual page.

The DP pool 115 is a storage region that consists of a plurality of physical pages. A physical page is a physical storage region. Physical pages are allocated to virtual pages. Data stored in a virtual page is stored in the physical page that is allocated to that virtual page. Image data for the guest OS is stored in two or more physical pages within the DP pool 115. In the following, each of these two or more physical pages in which an image of the guest OS is stored will be termed an "OS page".

The plurality of virtual volumes 113 include a master volume #M0 and two or more duplicate volumes #V00, #V01, and #V02 of this master volume #M0.

The master volume #M0 stores OS images common to a plurality of VMs #0 through #2. In concrete terms, for example, the master volume #M0 has an OS area (hereinafter termed the "master OS area"), but has no user area. Two or more OS pages in the DP pool 115 are allocated to the two or more virtual pages that constitute this OS area. An OS area is an area in which an image of the guest OS is stored, while a user area is an area which is written along with the execution of work (application programs), or in which read data (i.e. user data) is stored.

A duplicate volume (for example #V00) corresponds to a duplicate (i.e. a snapshot) of the master volume #M0. The duplicate volume #V00 includes an OS area (hereinafter termed the "duplicate OS area") and a user area. Each of the duplicate OS area and the user area consists of two or more virtual pages.

All of the OS pages allocated to the master OS area are allocated to the two or more virtual pages that make up the duplicate OS area. In other words, while a duplicate volume (for example #V00) is a duplicate of the master volume #M00, it is not the virtual pages that make up the master OS area that are allocated to the duplicate OS area; rather, it is the OS pages allocated to the master OS area (i.e. the physical pages within the DP pool) that are allocated thereto.

On the other hand, it is the physical pages that are not allocated to the master volume #M0 that are allocated to the two or more virtual pages that make up the user area.

In this manner, in each of the duplicate volumes, the OS pages (i.e. physical addresses) allocated to the master volume #M0 are allocated only to the OS area. In other words, in each of the duplicate volumes, there are present both an area (a duplicate OS area) to which physical pages that are allocated to the master volume are allocated, and also an area (i.e. a user area) to which physical pages that are not allocated to the master volume are allocated.

In this type of environment, the following processing is performed.

As shown in FIG. 1, for each VM, a duplicate volume is created on the basis of the master volume (a step S1). And, for each of these duplicate volumes, all of the OS pages allocated to the master volume are allocated to a duplicate OS area. A duplicate volume is supplied to each of the VMs. As a result, as shown in FIG. 1, the duplicate volume #V00 is mounted to the VM#0, the duplicate volume #V01 is mounted to the VM#1, and the duplicate volume #V02 is mounted to the VM#2. In this environment, the VM#0 (or #1 or #2) is able to acquire the guest OS from the two or more OS pages through the duplicate volume #V00 (or #01 or #02), due to transmission of an I/O (Input/Output) command in which is designated the address of the duplicate OS area of the duplicate volume #V00 (or #01 or #02).

Thereafter let it be supposed that, as shown in FIG. 2A, client #0 has applied a patch to the guest OS of VM#0 (a step S2). In this case, the VM#0 transmits to the storage device 105 a write command in which the patch that has been applied is the write subject. As its write destination, this write command includes information about the destination to be accessed that specifies the duplicate volume #V00, the address of the duplicate volume #V00 within the duplicate OS area, and the data size (for example, the size of the patch).

The storage device 105 receives this write command and specifies, from the access destination information in the write command, the write destination (i.e. which one or more virtual pages, in which duplicate volume, are to be the write destination). And the storage device 105 executes the step S3, including the processing now to be described.

(A step S3a) The storage device 105 allocates one or more not yet allocated physical pages within the DP pool 115 (i.e. physical pages that are in the state of not yet being allocated to any virtual pages, but that are capable of being so allocated) to one or more virtual pages of the write destination (i.e. to one or more virtual pages within the duplicate OS area), instead of one or more OS pages that are already allocated. And the storage device 105 writes the patch that is the write subject appended to the write command, to these one or more physical pages that have been allocated.

(A step S3b) The storage device 105 allocates the above described one or more physical pages to which the patch that is the write subject is written to one or more virtual pages in the master volume #M0, instead of one or more OS pages that are allocated to those one or more virtual pages. The one or more virtual pages described above within the master volume #M0 are virtual pages that correspond to one or more virtual pages of the write destination within the duplicate volume #V00.

Due to this step S3, the guest OSs that are acquired from the duplicate volume #V00 and the master volume #M0 are OSs to which the patch is applied.

The storage device 105 then, via the host 103, queries all of the clients #1 and #2 among the plurality of clients #0 through #2 that communicate with the plurality of VMs #0 through #2 to which the guest OS is common, with the exception of the client #0 that is the source of transmission of the patch, as to whether or not updating should be performed (i.e. whether or not the patch should be applied) (a step S4).

Figure 2B:
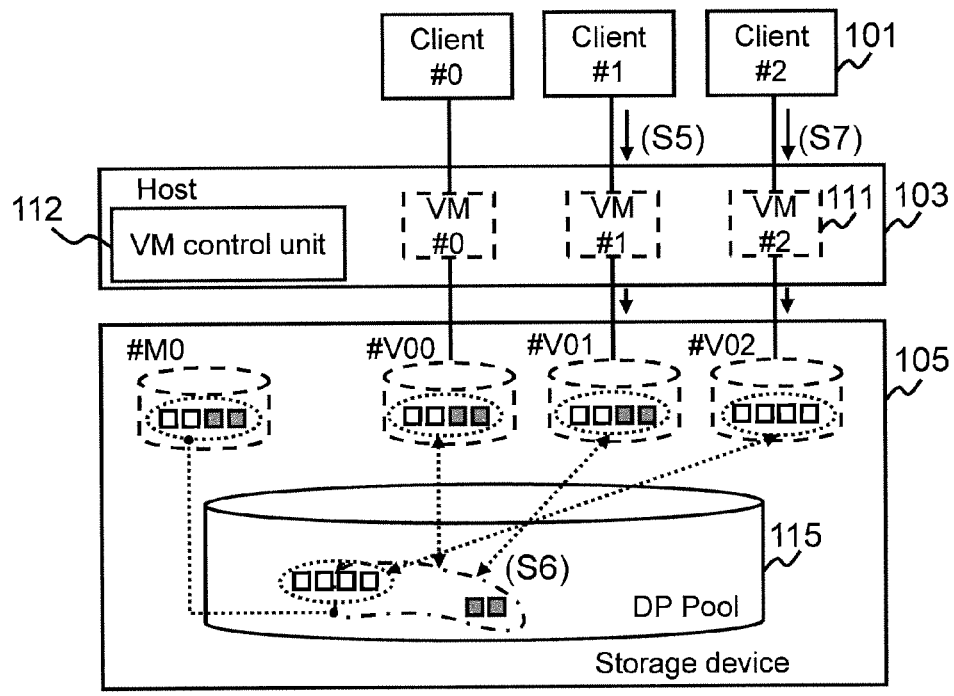
FIG. 2B shows the remainder of this processing summary performed in the first embodiment.

Let it be supposed that, as shown in FIG. 2B (a step S5), the storage device 105 has received from the client #1 the response "YES" (i.e. a response that the patch is to be applied). In this case, the storage device 105 allocates OS pages to which the patch is written to the one or more virtual pages within the duplicate volume #V01, instead of the one or more OS pages that are allocated to those one or more virtual pages (a step S6). As a result, mapping status of the duplicate volume #V01 becomes similar to the mapping status of the master volume #M0. In other words, the storage device 105 changes the one or more OS pages that are allocated to the duplicate volume #V01, ignoring the receipt of the write command from the VM#1, to one or more other physical pages. The above described one or more virtual pages within the duplicate volume #V01 are virtual pages that correspond to one or more virtual pages of the above described write destination within the duplicate volume #V00. And subsequently the guest OS that is acquired from the duplicate volume #V01 is an OS to which the application of the patch has been completed.

On the other hand let it be supposed that, as shown in FIG. 2B (a step S7), the storage device 105 has received from the client #2 the response "NO" (i.e. a response that the patch is not to be applied). In this case, the storage device 105 changes the OS pages allocated to the duplicate volume #2 to different physical pages.

The above is a summary of the first embodiment. According to this explanation, in the master volume #M0 and all the duplicate volumes whose updating is "YES", the OS image is the same. More specifically, the OS image in the master volume #M0 becomes the same with the OS image in the lastly updated duplicate volume. Further, when the first patch is written in the first duplicate volume and the response "NO" for the updating of the second duplicate volume is received, and then the second patch is further written on the first duplicate volume and the response "YES" for the updating of the second duplicate volume is received, the first and second patch reflected on the master volume #M0 are applied to the second duplicate volume. In other words, as to the duplicate volume whose updating is "YES", physical page that becomes similar to the mapping status of the master volume is allocated to the virtual page (address) that has difference with the mapping status of the master volume.

It should be understood that the storage device 105 may perform the step S6 described above for all of the other duplicate volumes #V01 and #V02 corresponding to the master volume #M0, without any enquiry as to whether updating is required.

Figure 3A:
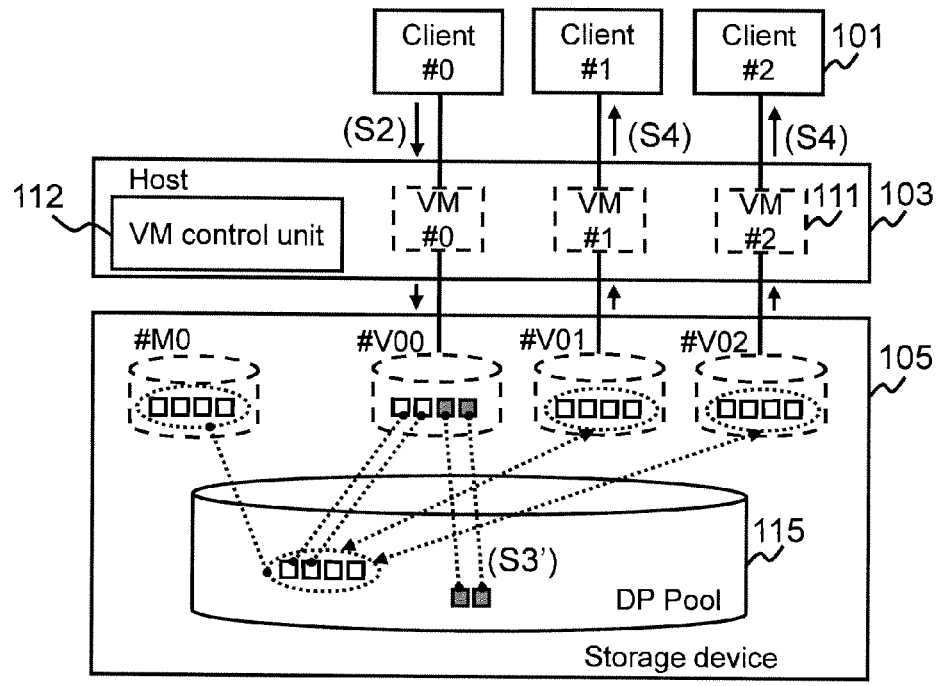
FIG. 3A shows a variant of the processing summary performed in the first embodiment.
Figure 3B:
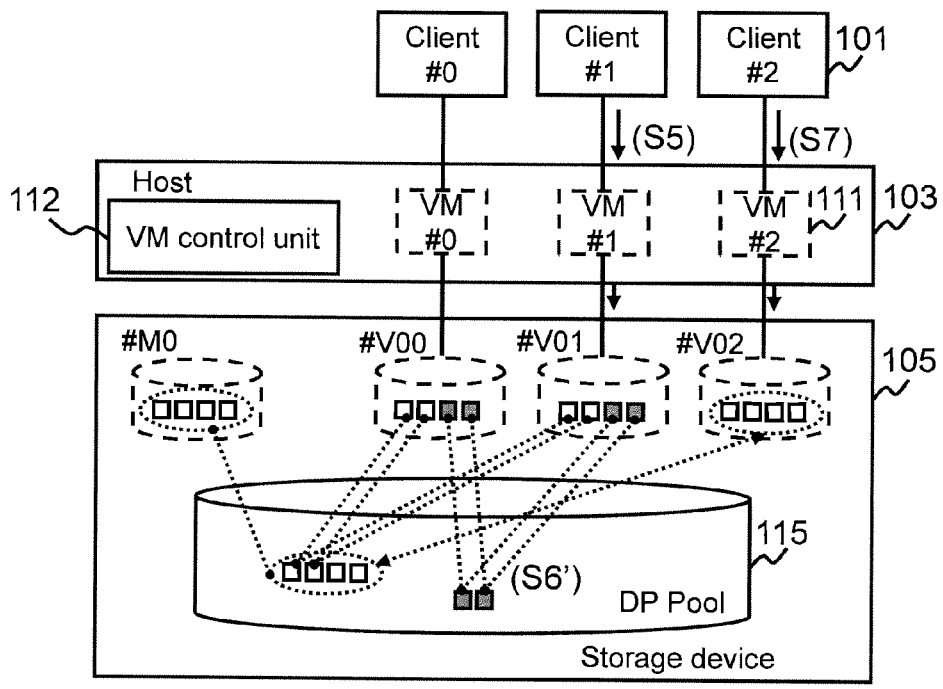
FIG. 3B shows the remainder of this variant of the processing summary performed in the first embodiment.

Furthermore, as shown in FIG. 3A, in the step S3, the storage device 105 may not perform the step S3b described above, even though it performs the step S3a described above. In other words, the storage device 105 may not allocate one or more physical pages in which patches are stored via the duplicate volume #V00 to the master volume #M0 (a step S3'). And if the storage device 105 receives the response "YES" from the client #1, then, as shown in FIG. 3B, it allocates the one or more physical pages only allocated to the duplicate volume #V00 (i.e. the physical pages in which the patch is stored) to one or more virtual pages within the duplicate volume #V01, instead of one or more OS pages (a step S6').

Moreover, for example, in response to a command from a manager, a management console (described hereinafter) may specify to the storage device 105, whether or not to apply the patch stored via the duplicate volume in the DP pool 115, to the master volume #M0. In this case it would also be acceptable, in response to this specification, for the storage device 105 to control whether or not the one or more physical pages in which the patch is stored are allocated to the master volume #M0.

Even further, the master volume #M0 may be supplied to the VM 111, or may not be so supplied (in this embodiment, the master volume #M0 is not supplied to the VM 111). For example, it would be acceptable for the master volume #M0 to be mounted to the VM #0, instead of the duplicate volume #V00.

Yet further, the virtual pages and the physical pages may be of the same size, and for this reason, it may be acceptable for one physical page to be allocated to one virtual page. However this is not to be considered as being limitative; it would also be acceptable for a plurality of physical pages to be allocated to one virtual page, or for one physical page to be allocated to a plurality of virtual pages. Still further, the capacity of the virtual pages and/or the capacity of the physical pages may be fixed, or may be variable.

Now, the first embodiment will be explained in detail in the following.

FIG. 4 shows the structure of a computer system in which a storage device 105 according to the first embodiment is included.

As previously described, the host 103 is coupled to the storage device 105, and the clients 103 are coupled to the host 103. Furthermore, a management console 107 is coupled to the storage device 105 via a dedicated line or a communication network. This management console 170 may, for example, be a computer having an input device and a display device. The management console 107 could also consist of a computer (a client computer) actuated by a manager, and another computer (a server computer) interposed between that client computer and the storage device 105.

The storage device 105 comprises a plurality of physical storage devices 403 (hereinafter termed "PDEVs") and a controller 401 coupled to the plurality of PDEVs 403.

The PDEVs 403 may, for example, be HDDs (Hard Disk Drives) or SSDs (Solid State Drives). The plurality of PDEVs 403 constitute one or more RAID groups. Each RAID group is constituted by one or more of the PDEVs 403. One or more logical volumes are formed on the basis of the storage regions maintained by each RAID group and the RAID level of the RAID group. Accordingly, a plurality of logical volumes are created on the basis of the one or more RAID groups. The DP pool 115 may be formed from one or more of the logical volumes among this plurality of logical volumes.

The controller 401 includes a first communication interface to the host 103, a second communication interface to the management console 107, a third communication interface to the PDEVs 403, a storage resource, and a processor coupled to the above devices. In concrete terms, for example, the controller 401 may include a host I/F 412, a management I/F 413, a PDEV I/F 416, a cache 415, a memory 411, and a CPU 414 coupled to the above devices.

The host I/F 412 is a communication interface device to the host 103. The management I/F 413 is a communication interface device to the management console 107. And the PDEV I/F 416 is a communication interface device to the PDEVs 403.

The cache 415 is a storage region (for example, a memory) that temporarily stores data written into the PDEVs 403 and data read from the PDEVs 403.

The memory 411 stores computer programs executed by the CPU 414, and information used by this CPU 414. The memory 411, for example, may store the following:

a RAID control program 421 that performs control of RAID structure management, of generation of parity data, and so on;

a host I/F control program 422 that performs analysis of I/O commands;

a PDEV I/F control program 433 that controls input and output data to and from the PDEVs 403;

a DP control program 424 that controls physical page allocation when writing to a virtual volume;

a WSS (Writeable SnapShot) control program 425 that performs master volume management and duplicate volume management;

a mapping management table 426 that holds information specifying the correspondence relationship between virtual addresses of duplicate volumes (i.e. virtual pages) and physical pages (i.e. physical addresses) within the DP pool 115; and a master management table 427 that holds information specifying master volume attributes.

FIG. 5 shows the structure of this mapping management table 426 according to the first embodiment.

For each virtual page, this mapping management table holds the following information:

its volume number 501, that is the number of the virtual volume that includes this virtual page;

the virtual address 502 of this virtual page;

a directly preceding physical address 503, that is the physical address of the physical page that was allocated to this virtual page directly before the physical page that is currently allocated to this virtual page was allocated to this virtual page;

the physical address 504 of the physical page that is currently allocated to this virtual page; and a data attribute 505, that specifies an attribute of the data stored in this virtual page (or, to put it in another manner, an attribute of the area in which this virtual page is included).

From the data attribute 505 corresponding to the virtual page that is the I/O destination specified by an I/O command, the host I/F control program 422 is able to specify in which of the duplicate OS area and the user area this virtual page is included.

Moreover, the WSS control program 425 is able to allocate the physical page that is specified by the directly preceding physical address 503 corresponding to a virtual page in a duplicate volume that is a subject for restoration, to that virtual page. By doing this, the host (VM) 103 is able to acquire the directly previous data that was stored via this virtual page, via the duplicate volume that is the subject for restoration.

FIG. 6 shows the structure of the master management table 427.

For each master volume, the master management table 427 holds the following information:

a master volume number 1401, that is the number of this master volume;

master volume attributes 1402, that are information specifying attributes of this master volume; and duplicate volume numbers 1403, that are a list of numbers of one or more duplicate volumes corresponding to this master volume.

There are three types of master volume attribute: "performance", "OS version", and "application".

The attribute "performance" is the I/O performance of this master volume. This I/O performance is based upon the I/O performance of the PDEV 403 upon which this master volume is based. This I/O performance may be expressed, for example, by the I/O frequency (i.e. the number of I/O commands that can be processed per unit time (the units may be, for example, TOPS (I/Os Per Second))), or by the response time (the average time period, or the maximum time period, from receipt of an I/O command until the response is issued).

The attribute "performance" is the version of the guest OS that is stored in this master volume (i.e. in the two or more OS pages allocated to this master volume).

The attribute "application" is the application program that is executed by the guest OS.

Figure 7:
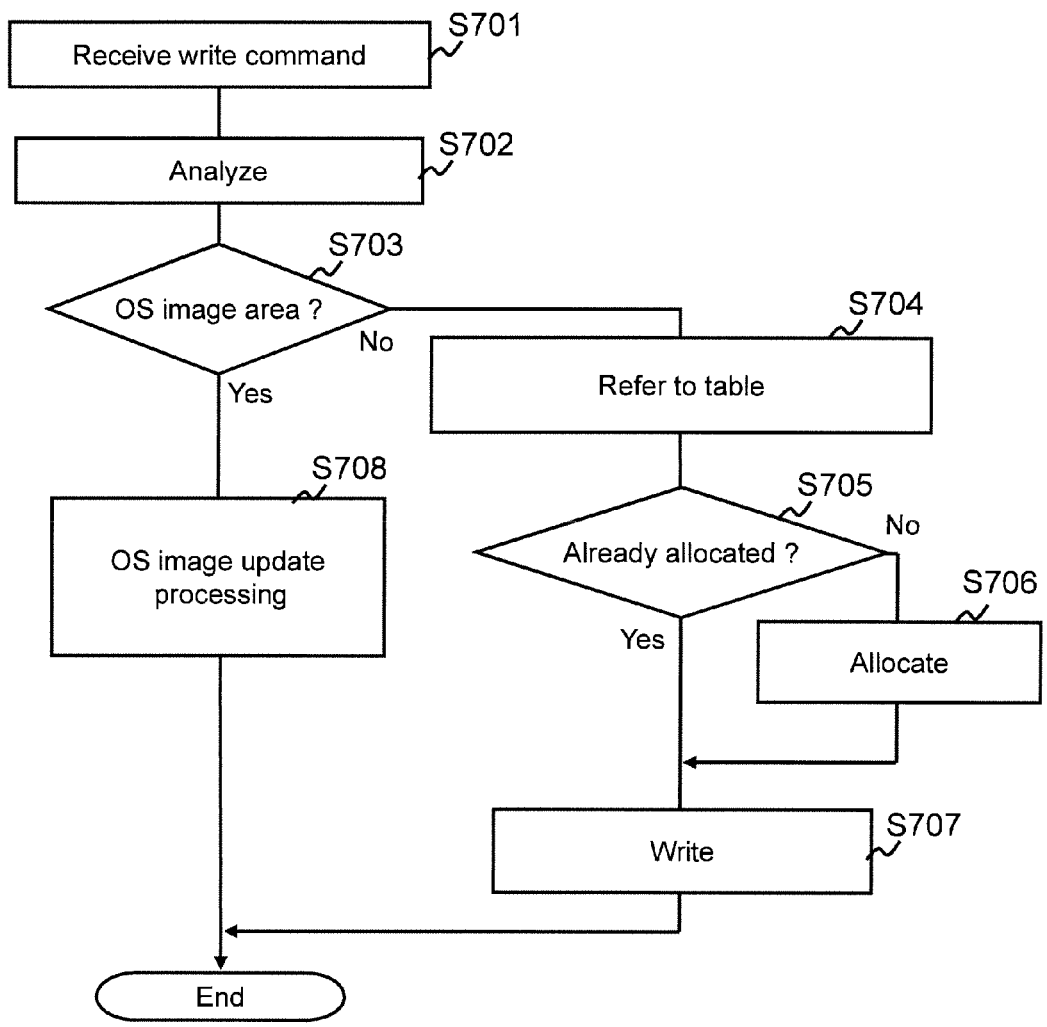
FIG. 7 shows a write processing flow according to the first embodiment.

FIG. 7 shows the flow of write processing according to the first embodiment. It should be understood that, in the explanation of FIGS. 7 and 8, it is supposed that the source of transmission of the write command is the VM#0, and consequently it is supposed that the logical volume designated by this write command is the duplicate volume #V00.

The host interface control program 422 receives from the VM #0, via the host I/F 412, a write command in which the duplicate volume #V00 is specified (a step S701). When a patch has been applied to the guest OS of the VM #0, the VM #0 transmits this write command in which the duplicate volume #V00, that is the subject for writing, is specified. The patch could also be applied from anywhere. For example, it could be applied from the management computer of one or more of the hosts 103.

Then the host I/F control program 422 specifies one or more virtual pages to be the destinations for writing by analyzing the access destination information held in the write command (for example, the number of the duplicate volume that is the write destination, the virtual address, and the data size) (a step S702). The subsequent step S703 and the following steps are performed for each of the virtual pages that are specified as write destinations.

The host I/F control program 422 specifies in which of the duplicate OS area and the user area the write destination virtual page specified in the step S702 is included (the step S703). In concrete terms, the program 422 refers to the data attribute 505 (i.e. to the information in the mapping management table 426) corresponding to the write destination virtual page. If the referred to data attribute 505 is "OS image", then the program 422 specifies that the write destination virtual page is within the duplicate OS area (YES in the step S703). On the other hand, if the referred to data attribute 505 is "user data", then the program 422 specifies that the write destination virtual page is within the user area (NO in the step S703). In the case of YES in the step S703, the WSS control program 425 is started by the host I/F control program 422, whereas in the case of NO in the step S703, the DP control program 424 is started by the host I/F control program 422.

In the case of NO in the step S703, the DP control program 424 refers to the mapping management table 426. In concrete terms, the DP control program 424 refers to the current physical address 504 that corresponds to the virtual page that is the write destination.

If the current physical address 504 is "NULL" (NO in the step S705), then the DP control program 424 allocates a physical page that is not yet allocated (a physical page that is in the state of not yet being allocated to any virtual page, and that is capable of being allocated) from the DP pool 115 to the write destination virtual page (a step S706). And the DP control program 424 updates the current physical address 504 corresponding to the write destination virtual page from "NULL", to the physical address of the physical page that has been allocated.

But if the current physical address 504 is not "NULL" (YES in the step S705), or after the step S706, the DP control program 424 writes the data of the write subject (i.e. the patch or a portion thereof) into the physical page specified by the current physical address 504 that corresponds to the write destination virtual page.

In the case of YES in the step S703, the WSS control program 425 performs OS image update processing (a step S708).

Figure 8:
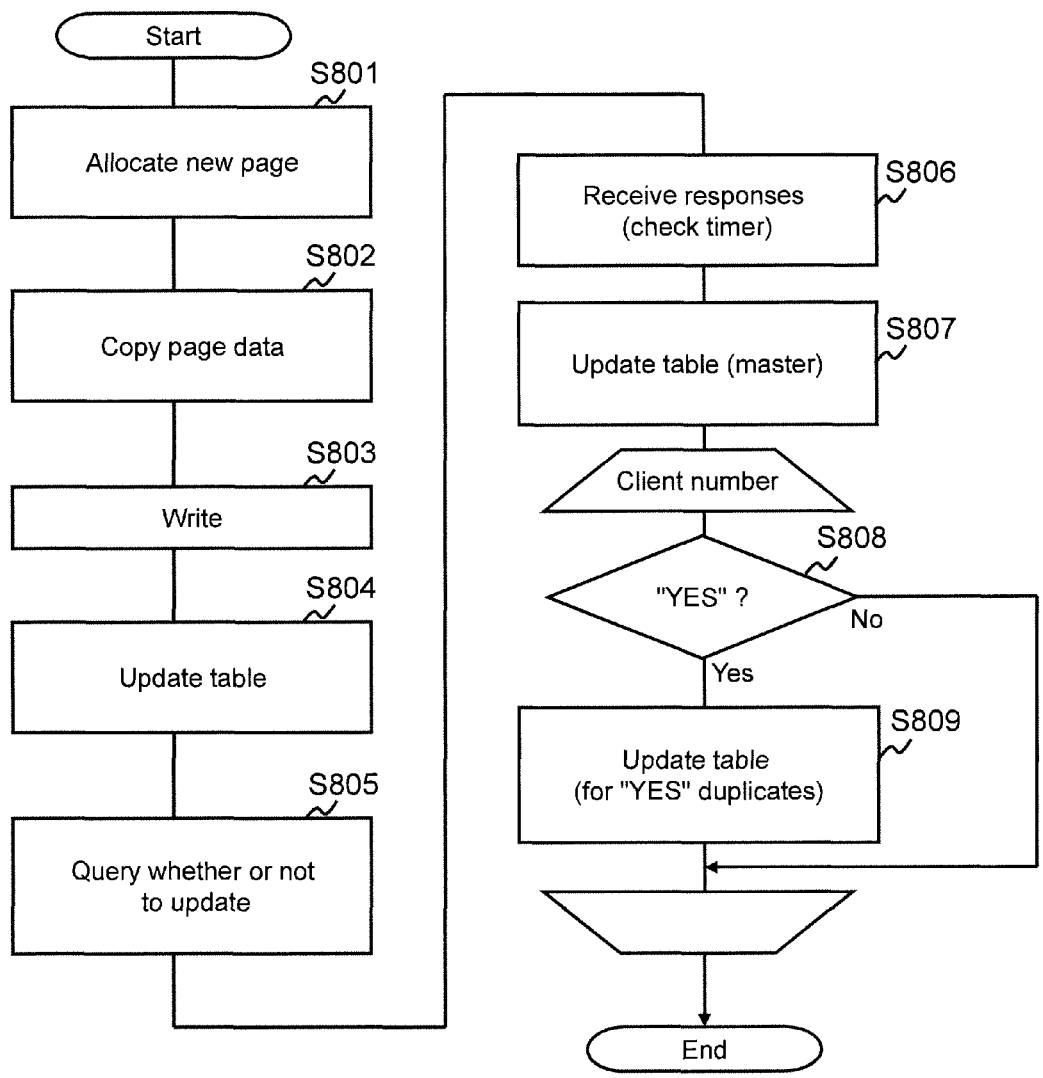
FIG. 8 shows an OS image update processing flow (a step S708 of FIG. 7) according to the first embodiment.

FIG. 8 shows the flow of this OS image update processing, according to the first embodiment (i.e. of the step S708 of FIG. 7).

The WSS control program 425 first allocates a physical page that is not yet allocated to the write destination virtual page, instead of the OS page that is allocated to this write destination virtual page (a step S801).

The WSS control program 425 then copies the page data in the OS page allocated to the write destination virtual page (i.e. the data in the entire area of the OS page) into the physical page that was allocated in the step S801 (a step S802).

Then the WSS control program 425 writes the data of the write subject (i.e. the patch or a portion thereof) into the physical page from which the page data was copied (a step S803).

The WSS control program 426 then updates the mapping management table 426 for the duplicate volume V#00 that is designated as the destination for storage of the patch (a step S804). In concrete terms, the WSS control program 425 performs the following processing:

Updating the directly preceding physical address 503 corresponding to the write destination virtual page to the physical address specified by the current physical address 504 before updating (in other words, the physical address of the physical page that was allocated to the write destination virtual page directly before the physical page allocated by the step S801 was allocated); and updating the current physical address 504 corresponding to the write destination virtual page to the physical address of the physical page allocated in the step S801.

By doing this, the physical addresses 503 and 504 that correspond to all or some of the virtual pages that make up the duplicate OS area within the duplicate volume V#00 are updated (refer to FIG. 9).

Next, a query is issued (a step S805) as to whether or not to update from the VMs #1 and #2, among the plurality of VMs #0 through #2 to which the guest OS is in common, other than the VM #0 that is the source of transmission of the write command of the step S701, to the clients #1 and #2 that are coupled to those VMs (i.e. as to whether or not to apply the patch). The query of the step S805 could be implemented substantially only with a function possessed by the storage device or by the host 103, or by functions of both the storage device 105 and the host 103. Various methods may be considered for implementing this step S805, of which two are described below by way of example. In this embodiment, the first of these methods is employed.

(Method #1) On the basis of the master management table 427, the WSS control program 425 specifies all of the other duplicate volumes #V01 and #02, corresponding to the master volume #M0 that corresponds to the duplicate volume #V00 designated as the destination for storage of the patch. And the WSS control program 425 queries the VMs #1 and #2 that access the duplicate volumes #V01 and #V02, whether or not updating should be performed. When the VMs #1 and #2 receive this query as to whether or not updating should be performed, they query the clients #1 and #2 that are coupled to these VMs #1 and #2 as to whether or not updating should be performed.

(Method #2) The VM control unit 112 (refer to FIG. 1) within the host 103 refers to the VM management information (for example, information that is stored in the storage resource within the host 103) that specifies which of the two or more VMs, among the plurality of VMs within the host 103, are ones to which the guest OS is in common. An, on the basis of this VM management information, the VM control unit 112 specifies which VMs, other than the VM #0, are the VMs executing the guest OS to which the patch is applied. And the VM control unit 112 queries the clients #1 and #2 that are coupled to the specified VMs #1 and #2, as to whether or not updating to these VMs #1 and #2 should be performed.

Then, for the clients #1 and #2 that were the destinations for querying as to whether or not to perform updating, the WSS control program 425 (or the VM control unit 112) counts the length of the time period (i.e. checks a timer) from when the queries were sent until a response is received. And the WSS control program 425 receives responses to the queries as to whether or not to perform updating from the clients #1 and #2, via the VMs #1 and #2 (a step S806). It should be understood that, if there is some client for which the length of the counted time period exceeds some fixed value while no response is received to the request as to whether or not to perform updating, then the WSS control program 425 continues the processing under the supposition that the response "NO (or the response "YES") was received for that client.

The WSS control program 425 then updates the mapping management table 426 for the master volume #M0 (a step S807). In concrete terms, the WSS control program 425 performs the following processing:

Specification of the master volume #M0 corresponding to the duplicate volume #V00 that is specified as the destination for storage of the patch, and of the virtual page within the master volume #M0 that corresponds to the write destination virtual page within the duplicate volume #V00 (hereinafter termed the "subject master virtual page");

Updating of the directly preceding physical address 503 corresponding to the subject master virtual page to the physical address specified by the current physical address 504 before updating (in other words, the physical address of the OS page allocated directly before the subject master virtual page); and Updating of the current physical address 504 corresponding to the subject master virtual page to the physical address of the physical page allocated in the step S801 to the write destination virtual page.

Due to this, the physical addresses 503 and 504 that correspond to all or some of the virtual pages that make up the master volume #M0 are updated (refer to FIG. 10). As a result, the guest OS acquired from the master volume #M0 is the same as the guest OS acquired from the duplicate volume #V00 (i.e. the guest OS to which the patch was applied).

The step S807 is performed, irrespective of whether there have been responses from the clients #1 and #2 as to whether updating should be performed or not.

The step S808 is then performed for each of the clients that was a target of the enquiry as to whether updating should be performed or not.

In the step S808, the WSS control program 425 decides whether or not the response from that client was "YES".

If the response from a client (for example #1) is "YES" ("YES" in the step S808), then the WSS control program 425 updates the mapping management table 426 (a step S809) for the duplicate volume (hereinafter termed the "reflector volume") (for example #V01) mounted to the VM (for example #1) that is coupled to the client that issued the "YES" response. In concrete terms, the WSS control program 425 performs the following processing:

Specification of the virtual page (hereinafter termed the "reflector subject virtual page") within the reflector volume #V01 that corresponds to the write destination virtual page within the duplicate volume #V00;

Updating of the directly preceding physical address 503 corresponding to the reflector subject virtual page to the physical address specified by the current physical address 504 before updating (in other words, the physical address of the OS page allocated directly before the reflector subject virtual page); and Updating of the current physical address 504 corresponding to the reflector subject virtual page to the physical address of the physical page allocated in the step S801 to the write destination virtual page.

Due to the above, the physical addresses 503 and 504 that correspond to all or a part of the virtual pages that make up the reflector volume #V01 are updated (refer to FIG. 10). As a result, the guest OS acquired from the reflector volume #V01 is the same as the guest OS acquired from the duplicate volume #V00 (i.e. the guest OS to which the patch was applied).

But, if the response from a client (for example #2) is "NO" ("NO" in the step S808), then the WSS control program 425 does not perform the step S809. In other words, the WSS control program 425 does not update the mapping management table 426 for the duplicate volume (for example #V02) mounted to the VM (for example #2) that is coupled to the client that issued the "NO" response (refer to FIG. 10).

Figure 11:
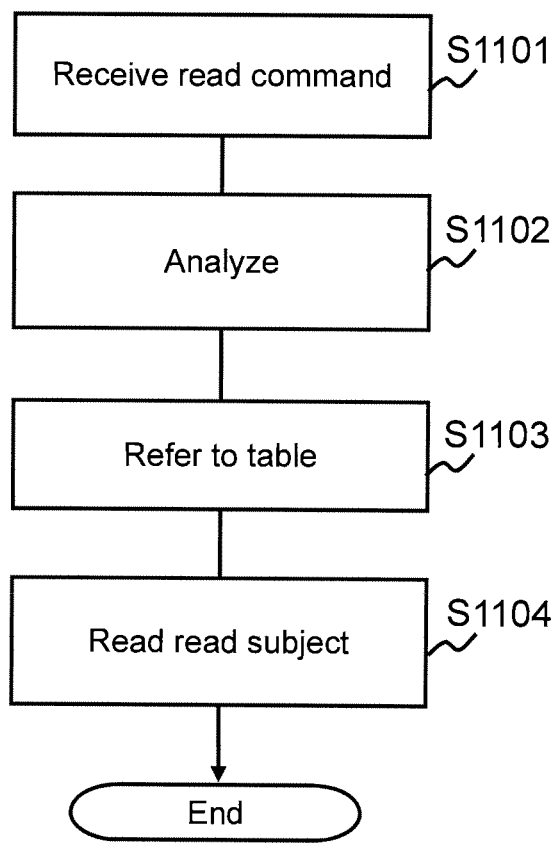
FIG. 11 shows a read processing flow according to the first embodiment.

FIG. 11 shows the flow of read processing according to the first embodiment.

The host I/F control program 422 receives from a VM, via the host I/F 412, a read command in which a duplicate volume is designated (a step S1101).

Then by analyzing the access destination information held in the read command (for example, the number of the duplicate volume to be the source for reading, its virtual address, and the data size), the host I/F control program 422 specifies one or more read pages to be the source for reading (a step S1102).

Then, by referring to the mapping management table 426, the DP control program 424 specifies one or more physical pages (a step S1103). These one or more physical pages that are specified are one or more physical pages specified by the one or more current physical addresses 504 corresponding to the one or more virtual pages that are the source for reading specified in the step S1102.

And then the DP control program 424 reads out the read subject data from the one or more physical pages that have been specified, and the host I/F control program 422 transmits this read subject data to the VM that was the source of transmission of the read command (a step S1104).

Figure 12:
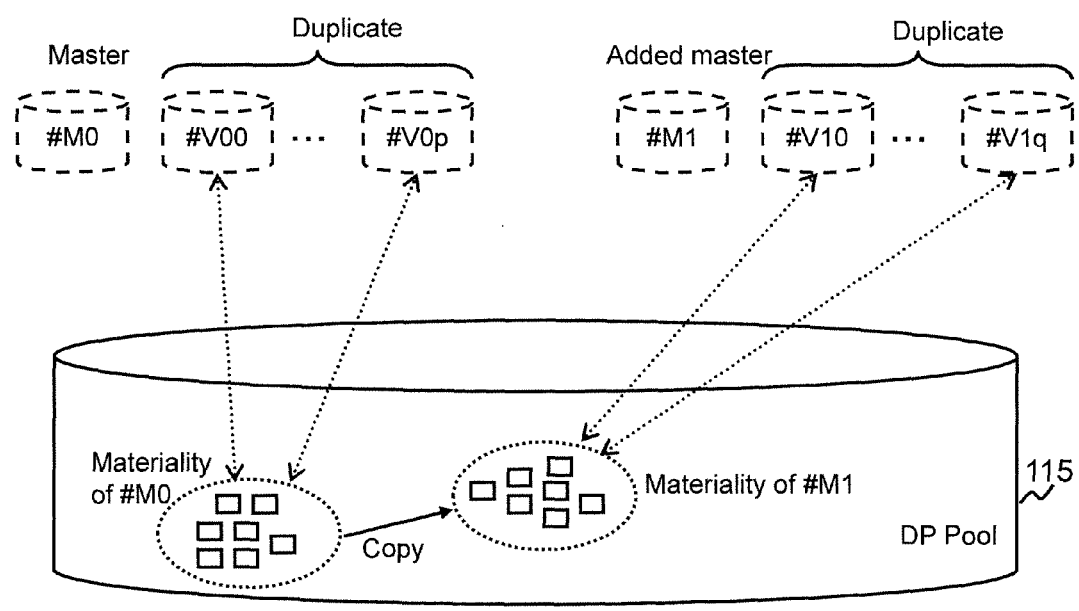
FIG. 12 shows a summary of master volume addition processing that can be performed during duplicate volume addition processing.

FIG. 12 shows a summary of master volume addition processing that can be performed during the duplicate volume addition processing.

It is decided whether or not a new master volume #M1 should be created for the master volume #M0. In concrete terms, it is decided whether or not the load is high upon the one or more duplicate volumes that already exist for the master volume #M0. In more concrete terms, for example, for this decision as to whether or not the load is high upon the one or more duplicate volumes that already exist for the master volume #M0, the WSS control program decides whether or not the condition (1) or the condition (2) described below is satisfied:

(1) The number of duplicate volumes for the master volume #M0 exceeds some predetermined limit number. This limit number could be set in advance in the memory 411 (for example in the master management table 427), or could be calculated on the basis of the performance of the master volume #M0 (i.e. its performance as specified from the master management table 427).

(2) The I/O performance of the one or more already existing duplicate volumes corresponding to the master volume #M0 (or of the already existing master volume #M0) (hereinafter termed the "subject I/O performance") is lower than some predetermined performance, for example the performance of the master volume #M0 (i.e. its performance as specified from the master management table 427). In concrete terms, for example, in the case of the subject I/O performance being the I/O frequency, then this subject I/O frequency (IOPS) is lower than the performance of the master volume #M0. Furthermore, for example, in the case of the subject I/O performance being the response time, then this subject response time is longer than a response time prescribed for the master volume #0.

The new master volume #M1 is created as a duplicate of the master volume #M0. In concrete terms, the following processing is performed:

The data in all of the OS pages (first physical pages) allocated to the master volume #0 is copied to a plurality of physical pages that have not yet been allocated (second physical pages) within the DP pool that holds those first physical pages (or some other DP pool); and A new master volume #M1 is created, and the plurality of second physical pages that are the destination for copying of the data are allocated to a plurality of virtual pages within this new master volume #M1.

Thereafter, a duplicate volume is created for the new master volume #M1. And the previously described plurality of second physical pages (i.e. a plurality of second physical pages in which the image of the guest OS is stored) are allocated to the virtual pages that constitute the duplicate OS area within this duplicate volume.

Figure 13:
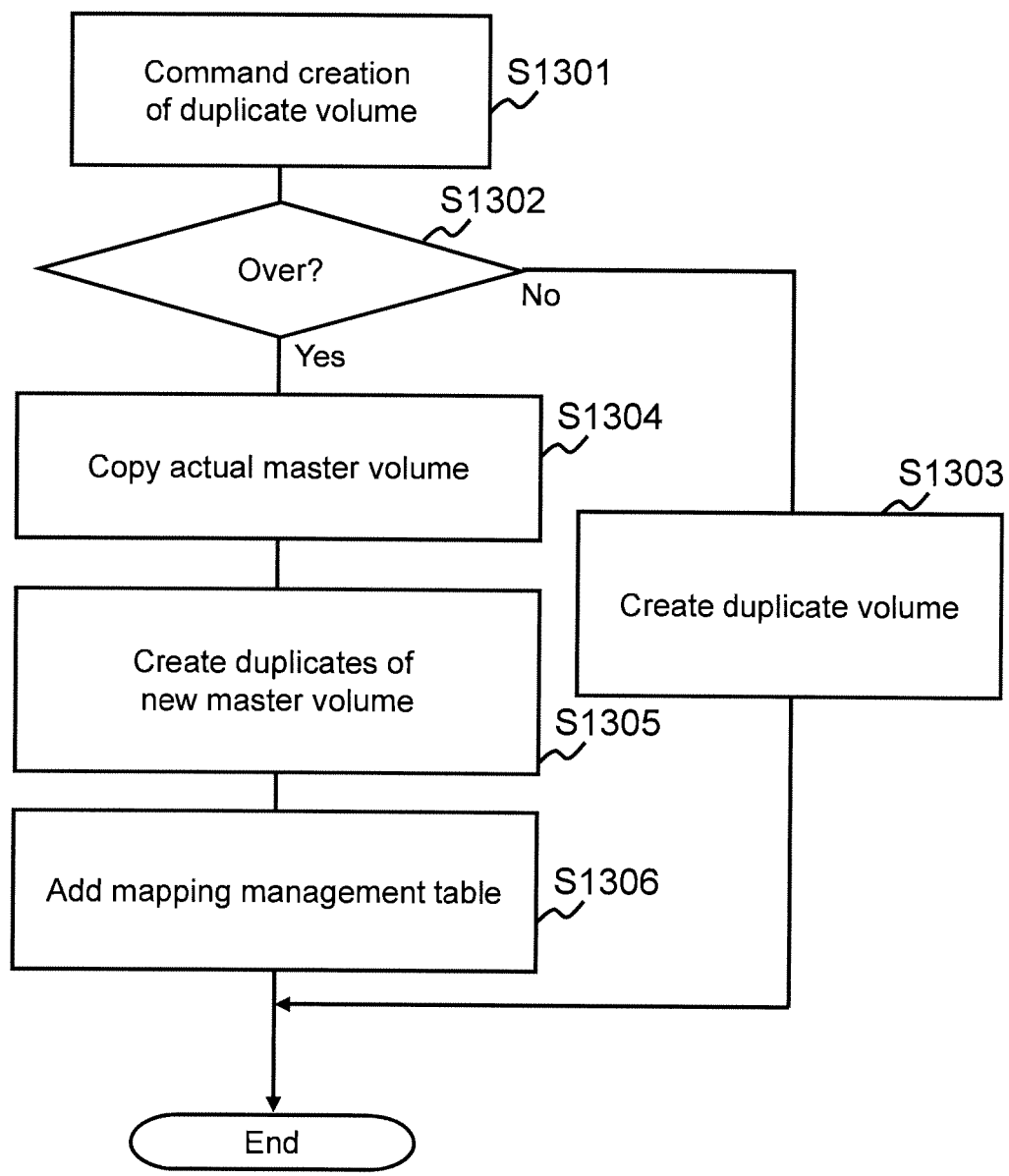
FIG. 13 shows a flow of duplicate volume addition processing.

FIG. 13 shows the flow of duplicate volume addition processing.

The WSS control program 425 receives a duplicate volume creation command from the management console 107, via the management I/F 413 (a step S1301). This duplicate volume creation command is a command that orders creation of a duplicate volume. Such a duplicate volume creation command may, for example, include the following information:

the number of the master volume corresponding to the duplicate volume (hereinafter termed the "designated master number"); and information specifying the number of duplicate volumes to be created (hereinafter termed the "designated number of volumes").

Then the WSS control program 425 decides whether or not the sum of the number of duplicate volumes for the master volume corresponding to the designated master number (hereinafter termed the "designated master volume") and the designated number of volumes is greater than a limit number corresponding to the designated master volume (a step S1302).

If the result of the decision in the step S1302 is negative (NO in the step S1302), then the WSS control program 425 creates the same number of duplicate volumes for the designated master volume as the designated number of volumes (a step S1303). At this time, the WSS control program 425 allocates all of the OS pages allocated in the designated master volume to a duplicate OS area in each duplicate volume that has been created. In concrete terms, for example, the WSS control program 425 adds records to the mapping management table 426 corresponding to the duplicate volumes that are created, and registers the physical addresses of the allocated OS pages in the added records (i.e. in the records corresponding to the virtual pages within the duplicate OS areas) as the current physical addresses 504. Moreover, in the master management table 427 (refer to FIG. 6), the WSS control program 425 adds the numbers of the duplicate volumes that have been created to the corresponding duplicate volume numbers 1403 in the designated master volume But if the result of the decision in the step S1302 is affirmative (YES in the step S1302), then the WSS control program 425 performs the step S1304. In concrete terms, the WSS control program 425 performs the following processing:

Copying of the data in all of the OS pages (first physical pages) allocated in the designated master volume to a plurality of not yet allocated physical page (second physical pages) within the DP pool that holds those first physical pages (or some DP pool other than that DP pool); and creation of the new master volume, and allocation of the plurality of second physical pages that were the destination of copying to a plurality of virtual pages within the new master volume.

For the new master volume that has been created, the WSS control program 425 then creates the same number of duplicate volumes as the designated number of volumes (a step S1305). At this time, the WSS control program 425 allocates the previously described plurality of second physical pages (i.e. the plurality of second physical pages in which the images of the guest OS are stored) to the virtual pages making up the duplicate OS areas within those duplicate volumes. It should be understood that, in the case described below, the WSS control program 425 may create M duplicates for the designated master volume, and may create N duplicates for the new master volume (where M and N are natural numbers).

(1) The designated number of volumes is (M+N).

(2) The difference between the limit number of designated master volumes and the number of duplicates of the designated master volume is M.

The WSS control program 425 then creates a new mapping management table corresponding to the new master volume (a step S1306). In this embodiment, a mapping management table exists for each master volume. The values of the various types of information held by the table created in this step S1306 are the values according to the steps S1304 and S1305.

Now, in this embodiment, it is possible to change which of the duplicate volumes corresponds to which of the master volumes. To put it in another manner, it is possible to perform grouping of the duplicate volumes for each of the master volumes. In the following, this grouping will be explained with reference to FIG. 14.

Figure 14:
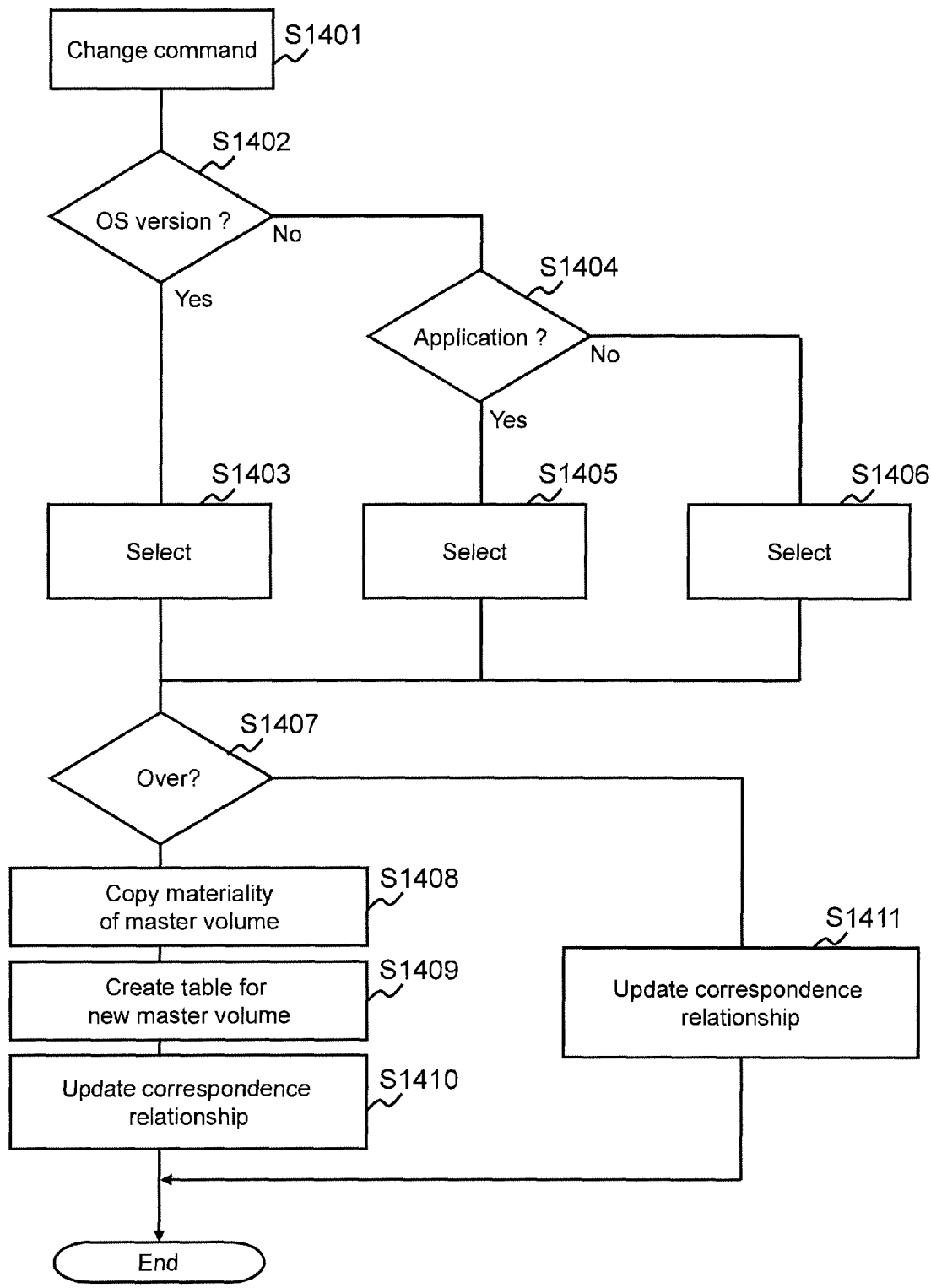
FIG. 14 shows a flow of master volume change processing.

FIG. 14 shows the flow of master volume change processing.

The WSS control program 425 receives a master volume change command from the management console 107 via the management I/F 413 (a step S1401). This master volume change command is a command to change the master volume corresponding to a duplicate volume. Such a master volume change command may, for example, include the following information:

The number of the duplicate volume (hereinafter termed the "duplicate volume number"); and Information (hereinafter termed the "specified attribute information") that specifies the attributes of the master volume (any of the performance, the OS version, and the application).

If the specified attribute information is information that specifies the OS version (YES in a step S1402), then the WSS control program 425 selects the master volume that matches the OS version specified by the specified attribute information, on the basis of the master management table 427 (a step S1403).

But, if the specified attribute information is information that specifies an application (NO in the step S1402 and YES in a step S1404), then the WSS control program 425 selects the master volume that matches the application specified by the specified attribute information, on the basis of the master management table 427 (a step S1405).

And, if the specified attribute information is information that specifies the performance (NO in the step S1402 and NO in the step S1404), then the WSS control program 425 selects the master volume that matches the performance specified by the specified attribute information, on the basis of the master management table 427 (a step S1406).

Hereinafter, the master volume selected by the step S1403, S1405, or S1406 will be termed the "selected master volume".

The WSS control program 425 decides whether or not the sum of the number of duplicates of the selected master volume and the number of designated duplicate volumes is greater than the limit number corresponding to the selected master volume (a step S1407).

If the result of the decision in the step S1407 is negative (NO in the step S1407), then the WSS control program 425 allocates all of the OS pages that are allocated to the selected master volume, to the duplicate OS area of the designated duplicate volume (a step S1411). In concrete terms, for example, the WSS control program 425 may register the physical addresses of the OS pages that are allocated as the current physical addresses corresponding to the virtual pages within the duplicate OS area of the designated duplicate volume. Furthermore, in the master management table 427 (refer to FIG. 6), the WSS control program 425 deletes the number of the designated duplicate volume from the duplicate volume number 1403 corresponding to the master volume that corresponded directly before the designated duplicate volume corresponded to the selected master volume, and moreover adds it to the duplicate volume number 1403 corresponding to the selected master volume.

But if the result of the decision in the step S1407 is affirmative (YES in the step S1407), then the WSS control program 425 performs the step S1408. In concrete terms, the WSS control program 425 performs the following processing:

Copying of the data in all of the OS pages (first physical pages) allocated to the selected master volume to a plurality of not yet allocated physical pages (second physical pages) in the DP pool that holds those first physical pages (or to some DP pool other than that DP pool); and Creation of a new master volume, and allocation of the plurality of physical pages that were the destination for copying of the data to a plurality of physical pages within this new master volume.

The WSS control program 425 then creates a mapping management table corresponding to the new master volume that has been created (a step S1409). Furthermore, the WSS control program 425 appends a record corresponding to the new master volume to the master management table 427.

Then the WSS control program 425 allocates all of the OS pages allocated to the new master volume to the duplicate OS area of the designated duplicate volume (a step S1410). In concrete terms, for example, the WSS control program 425 registers the physical addresses of the allocated OS pages as the current physical addresses 504 corresponding to the virtual pages within the duplicate OS area in the designated duplicate volume. Moreover, in the master management table 427, the WSS control program 425 deletes the number of the designated duplicate volume from the duplicate volume number 1403 corresponding to the master volume that corresponded directly before the correspondence of the designated duplicate volume, and also adds a duplicate volume number 1403 corresponding to the new master volume.

In this embodiment, it is possible to recover a duplicate volume that is allocated to two or more physical pages in which a guest OS to which some patch has been applied is stored, to a duplicate volume allocated to two or more physical pages in which a guest OS to which that patch has not been applied is stored.

Figure 15:
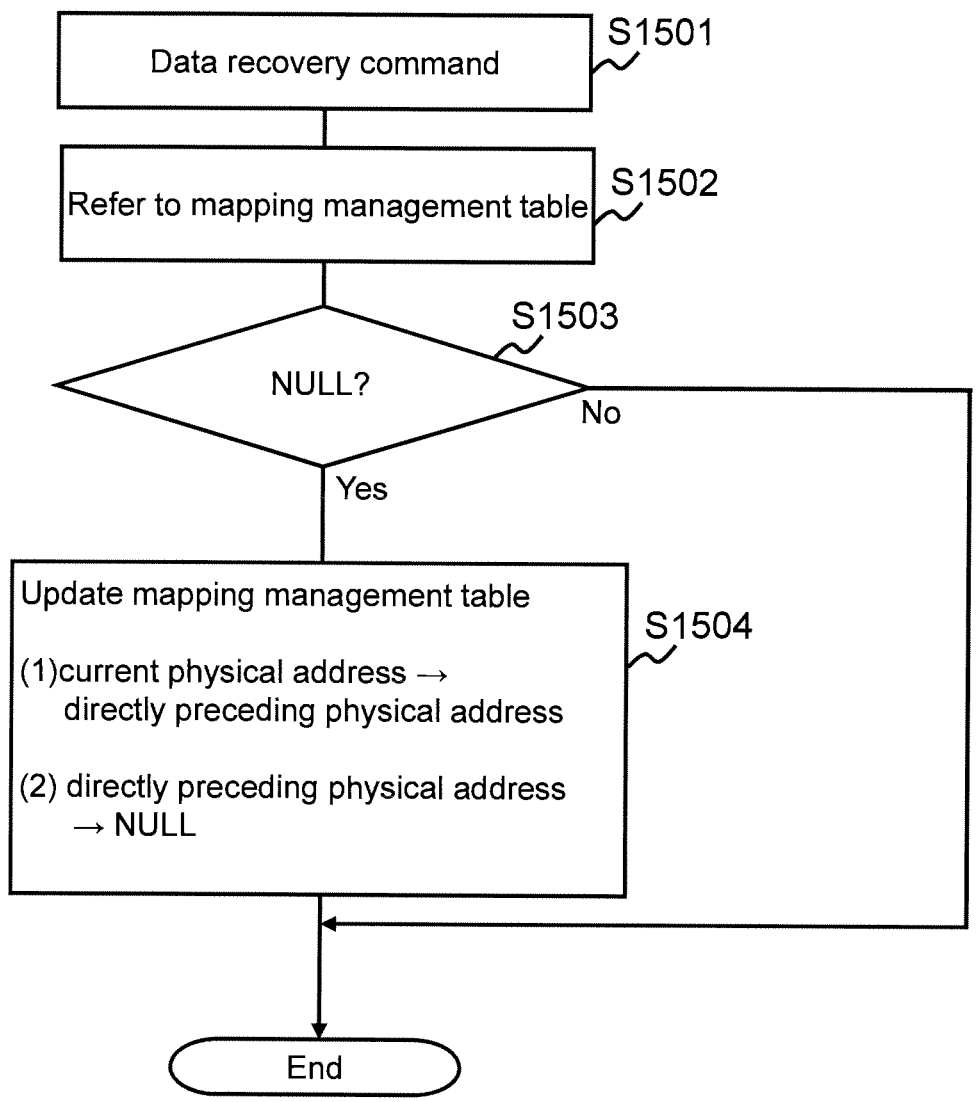
FIG. 15 shows a flow of recovery processing.

FIG. 15 shows the flow of recovery processing.

Figure 16:
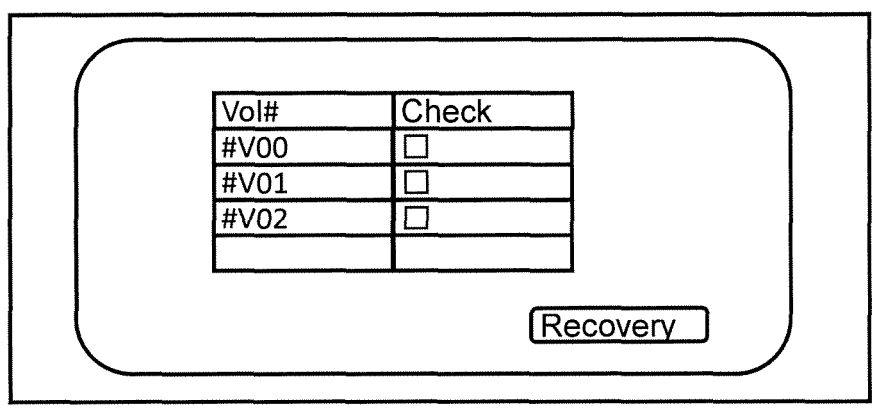
FIG. 16 shows an example of a GUI (Graphical User Interface) that is displayed upon a management console, according to the first embodiment.

The WSS control program 425 receives a data recovery command from the management console 107 via the management I/F 413 (a step S1501). This data recovery command is a command for recovery of a duplicate volume. A data recovery command may, for example, include the number of the duplicate volume that is to be the recovery subject (hereinafter termed the "recovery subject volume"). This number may be, for example, a number that has been designated by a manager via the GUI (Graphical User Interface) shown in FIG. 16. This GUI contains a list of duplicate volume numbers, and this list may, for example, be specified on the basis of the mapping management table 426 or the master management table 427.

The WSS control program 425 refers to the physical address corresponding directly before to the duplicate OS area in the recovery subject volume (a step S1502). And a step S1503 is performed for each of the virtual pages that make up the duplicate OS area in the recovery subject volume. In the following, as an example, the steps S1503 and subsequently will be explained for a single virtual page (termed the "subject virtual page" in the explanation of FIG. 15).

The WSS control program 425 decides whether or not the directly preceding physical address corresponding to the subject virtual page is "NULL" (the step S1503).

If the result of the decision in the step S1503 is negative (NO in the step S1503), then the WSS control program 425 allocates to the subject virtual page the physical page (i.e. the directly preceding physical page) that was allocated directly before the physical page that is allocated to the subject virtual page (i.e. the current physical page) was allocated, instead of the current physical page (a step S1504). In concrete terms, for example, the WSS control program 425 may perform the following processing:

Changing of the current physical address 504 corresponding to the subject virtual page to the physical address designated by the directly preceding physical address corresponding to the subject virtual page; and Changing of the directly preceding physical address 503 corresponding to the subject virtual page to "NULL".

But if the result of the decision in the step S1503 is affirmative (YES in the step S1503), then the WSS control program 425 skips the step S1504.

The above completes the explanation of the first embodiment.

According to this first embodiment, by a patch being applied to the guest OS of some VM, if the patch is written into one or more physical pages via the virtual pages of a portion of the duplicate OS area corresponding to that VM, then the physical page to which the patch is written is allocated to the duplicate OS area corresponding to another VM. In other words, the storage of a plurality of copies of the same patch is avoided. Consequently, it is possible to reduce the consumption of storage capacity.

Moreover, according to this first embodiment, if a patch that has been applied to the guest OS of some VM is written into the duplicate OS area corresponding to that VM, then it is queried whether or not to update the client via another VM, and, according to the response, it is determined whether or not the patch is to be applied to the guest OS of that other VM. In other words, it is possible for the client to determine whether or not the patch is to be applied.

It should be understood that, in this first embodiment, for the virtual pages that make up the OS areas, it would also be acceptable for the physical addresses of physical pages that have been allocated earlier that directly before to be managed, in addition to the directly preceding physical addresses 503. Furthermore, it would also be acceptable for the physical addresses of the physical pages that are allocated to virtual pages to be specified for each point in time and to be stored as history. In this case, it would be appropriate for the WSS control program 425 to receive from the management console a recovery command including a designation of a time instant specifying a desired point in time and a volume number, and to allocate the physical pages that were allocated at that time instant to the OS area within the virtual volume corresponding to that volume number.

Moreover, in the first embodiment, physical pages that are not allocated to any virtual pages (i.e. virtual addresses), are managed as being in a not yet allocated state, so that they may be allocated to different virtual pages. However, for physical pages that are being managed and that were allocated to virtual pages in the past (i.e. physical pages that are being history managed in the mapping management table), the DP control program 424 may not manage them as being in the not yet allocated state. The reason for this is that, during recovery, there is a possibility that physical pages that are being history managed may be allocated to virtual pages in the OS area.

Embodiment #2

In the following, another embodiment of the present invention will be explained. During this description, principally the points of difference from the first embodiment will be explained, and explanation of common features with the first embodiment will be omitted or abbreviated.

FIG. 17 shows a summary according to this second embodiment of the present invention.

In this embodiment, the master volume #M0 is an actual volume 188. This "actual volume" is a logical volume based upon one or more PDEVs 403.

The storage device 185 has a differential pool 195, instead of the DP pool 115. This differential pool 195, for example, may consist of one or more actual volumes.

A single duplicate volume (a logical volume) 186 that consists of a snapshot volume 187 and the actual volume 188 is supplied to a VM 111.

The snapshot volume 187 is a logical volume in which a guest OS is stored, and is a virtual logical volume corresponding to a snapshot of a master volume #0. Accordingly, the guest OS may be acquired from the snapshot volume 187.

User data is stored in the actual volume 188.

The storage device 185 has the following functions. In the following, it is supposed that a logical volume is made up of a plurality of logical storage regions (hereinafter termed "blocks"). Moreover, blocks within a snapshot volume will be termed "snap blocks", blocks within the master volume will be termed "master blocks", and blocks within the differential pool 195 will be termed "pool blocks".

All of the snap blocks that make up the snapshot volume 187, initially, correspond one-to-one with all of the master blocks that make up the master volume #M0. Due to this, the data that is read from some snap block is data that is read from the master block that corresponds to this snap block.

When data is written into some snap block (hereinafter termed the "first snap block"), block data that includes this data is stored in a pool block within the differential pool 195 (hereinafter termed the "first pool block"). This block data is data in a master block that corresponds to the first snap block (hereinafter termed the "first master block"). The first snap block is made to correspond to the first pool block, instead of the first master block. Subsequently, when data is written into the first snap block, this data is written into the first pool block. And, when a read command is received in which a logical address belonging to the first snap block is designated, the data is read from the first pool block that corresponds to that first snap block. On the other hand, when a read command is received in which a logical address belonging to some snap block other than the first snap block is designated, the data is read from the master block that corresponds to that snap block.

In the following, a summary of the processing performed in this embodiment will be explained. It should be understood that, in the following explanation, a snapshot volume within a duplicate volume K will be termed a "snapshot K" (K is the volume number).

As shown in FIG. 17, three snapshot volumes of the master volume #M0 are created (a step S11). These three snapshot volumes are included in the duplicate volumes #V00, #51, and #52.

Figure 18A:
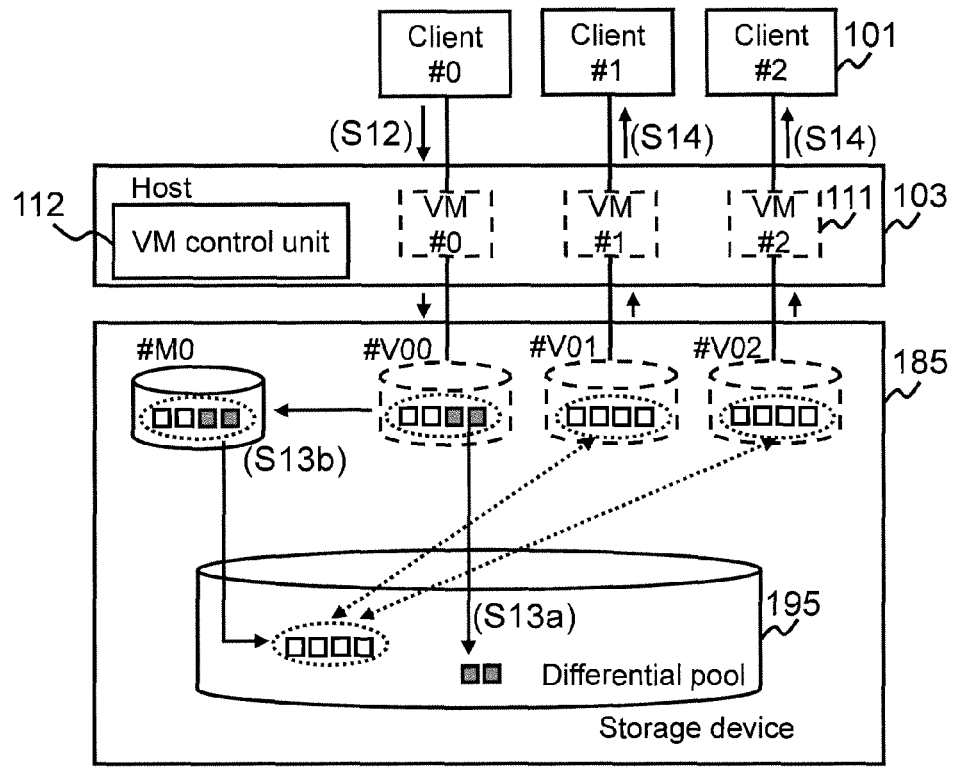
FIG. 18A shows a portion of a processing summary performed in the second embodiment.

As shown in FIG. 18A, when a patch has been applied to the guest OS of the VM #0 (a step S12), this patch is written into the snapshot #V00. For this reason, the block data included in the patch (that is data read from the master block corresponding to the snap block that is the write destination for the patch, i.e. data including the patch that is the write subject) is written into a pool block within the differential pool 195 (a step S13a).

The storage device 185 restores the master volume #M0 (a step S13b).

In concrete terms, the storage device 185 performs the following processing:

Writing (backing up) of the guest OS image within the master volume #M0 into the differential pool 115 and Reading out of data from the snapshot #V00, and copying of the read data to the master volume #M0.

The data read from the snapshot #V00 is an image of the guest OS in which the patch is included. And, from the snapshot #V00, is read from the blocks corresponding to the snap blocks. Snap blocks in which the patch has been stored correspond to pool blocks, while snap blocks in which the patch is not stored correspond to master blocks. Accordingly, the patch of the guest OS image is read from pool blocks, while the other portions of the guest OS image are read from master blocks.

The storage device 185 queries (a step S14) whether or not to update (i.e. whether or not to apply the patch) via the host 103 to all of the clients #1 and #2 among the plurality of clients #0 through #2 that communicate with the plurality of VMs #0 through #2 that have the guest OS in common, other than the client #0 that is the source of transmission of the patch.

Figure 18B:
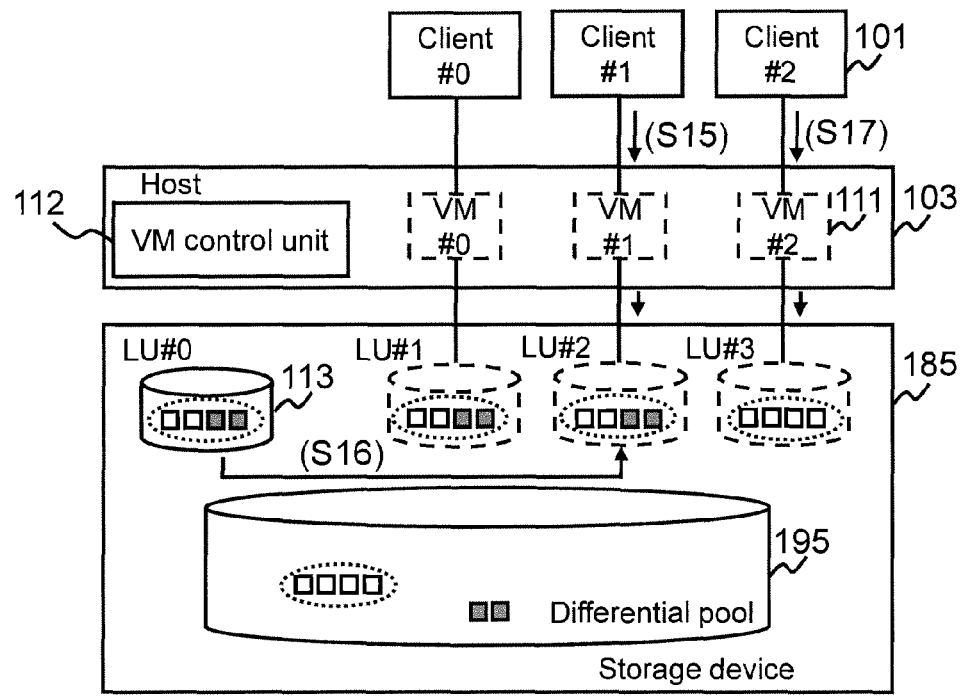
FIG. 18B shows the remainder of this processing summary performed in the second embodiment.

As shown in FIG. 18B, suppose that the storage device 185 receives the response "YES" from the client #1 (i.e. a response that the patch is to be applied) (a step S15). In this case, the storage device 105 performs resynching from the master volume #M0 to the snapshot #V01. In concrete terms, the storage device 105 establishes a one-to-one correspondence of all of the master blocks that make up the master volume #M0 after restoration to all of the snap blocks that make up the snapshot #V01.

On the other hand suppose that, as shown in FIG. 18B, the storage device 185 has received the response "NO" (i.e. the response that the patch is not to be applied) (a step S17). In this case, (i.e. at the time of restoration) the storage device 105 establishes one-to-one correspondence of all of the pool blocks that are the destination for backup of the guest OS image from the master volume #M0, to all of the snap blocks that make up the snapshot #V02.

The above is a summary of the second embodiment.

It should be understood that the storage device 185 may not query whether or not to perform updating, but may perform the step S16 described above for all of the other snapshots #V01 and #V02 corresponding to the master volume #M0.

Moreover, in the step S13*b*, it would also be acceptable for the data that is copied to the master volume #M0 to be only block data in which the patch is included. In this case, the data that is backed up from the master volume #M0 to the differential pool 195 may be only block data before updating within the master block of the copy destination for block data in which the patch is included (in other words, the master block corresponding to the snap block of the write destination of the patch). Furthermore, in this case, in the step S16, it would also be acceptable for the pool block that is in correspondence with the snap block that is the patch writing destination to be made to correspond to the snap block corresponding to the snap block that is the patch writing destination in the snapshot #V00 (i.e. a snap block within the snapshot #V01).

Figure 19:
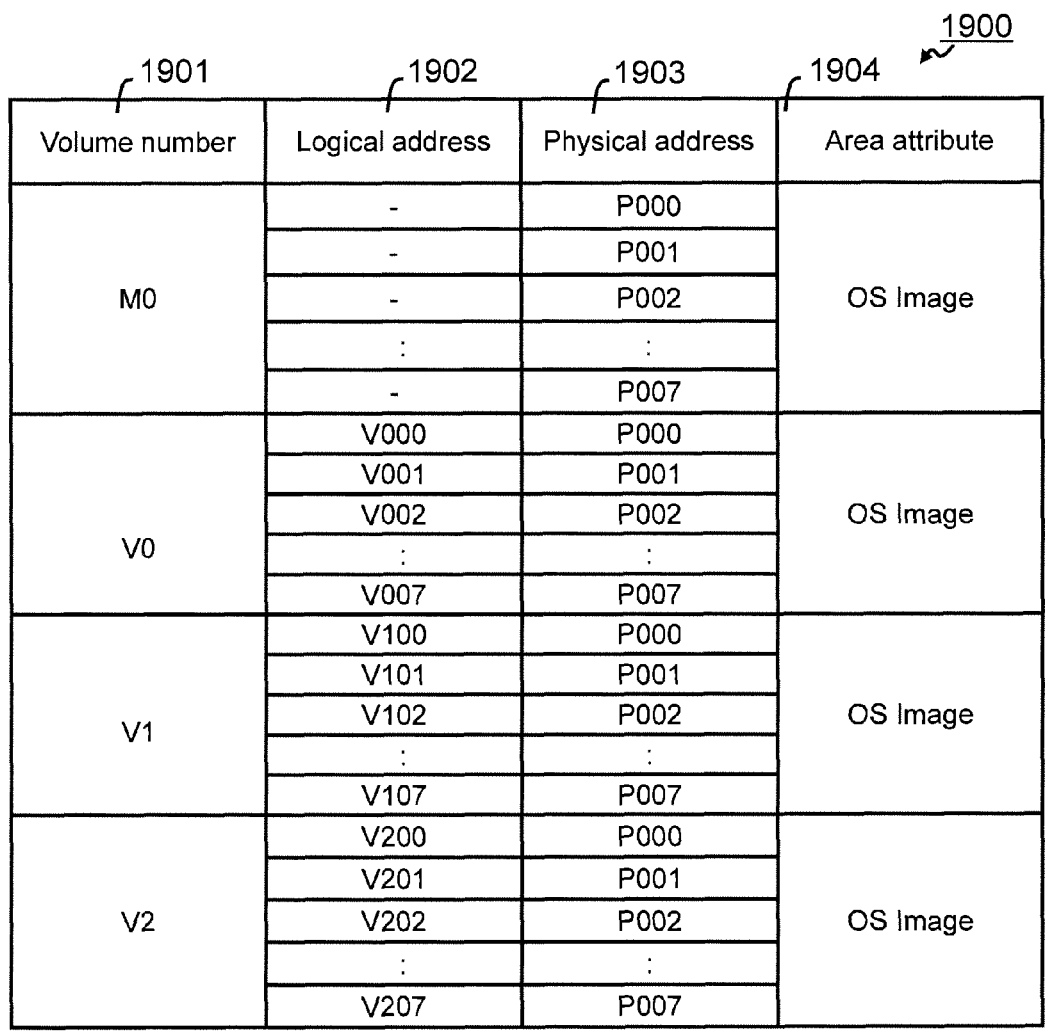
FIG. 19 shows a mapping management table according to the second embodiment.

FIG. 19 shows the mapping management table according to the second embodiment.

According to this mapping management table 1900, in the snapshot volumes, for each snap block (i.e. logical address), the physical address of the block (the master block or the pool block) that is in correspondence with this snap block is registered. The point of difference from the mapping management table 426 according to the first embodiment is that there is no column corresponding to the directly preceding physical address 503.

Figure 20:
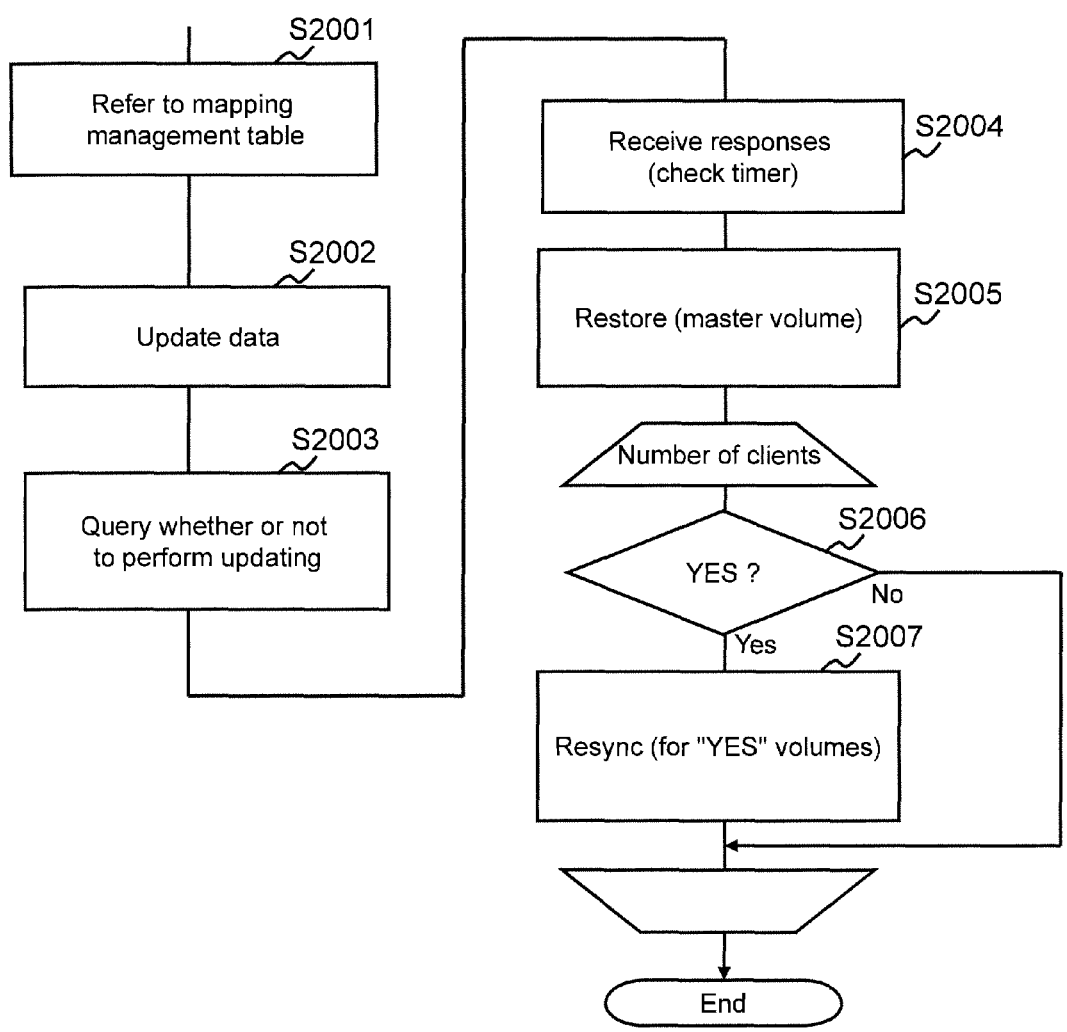
FIG. 20 shows an OS image update processing flow according to the second embodiment.

FIG. 20 shows the OS image update processing flow according to the second embodiment. It should be understood that, in the following explanation, the WSS control program according to this second embodiment is called the "WSS control program 425'".

First, the WSS control program 425' refers to the mapping management table 1900 (a step S2001).

Then the WSS control program 425' writes the patch into the snap block that is the write destination for the patch (a step S2002).

Queries as to whether or not to perform updating (i.e. whether or not to apply the patch) are issued (a step S2003) from those VMs (for example #1 and #2), among the plurality of VMs #0 through #2 to which the guest OS is common, other than the VM (for example #0) that is the source of transmission of the patch writing command, to the clients #1 and #2 that are coupled to them. The queries of the step S2003 are made in a similar manner to the queries of the step S805.

Then, for each of the clients #1 and #2 that is the destination of a query as to whether or not to perform updating, the WSS control program 425' (or the VM control unit) counts the length of the time periods (i.e. monitors a timer) from when the queries were issued until a response is received. And the WSS control program 425' receives responses to the queries as to whether or not to perform updating from the clients #1 and #2 via the VMs #1 and #2 (a step S2004). It should be understood that, if there is some client for which the length of the time period that has been counted exceeds some fixed value with no response having been received as to whether or not to perform updating, then, for that client, the WSS control program 425' continues with processing under the assumption that the response "NO" (or the response "YES") was received Then the WSS control program 425' performs restoration from the snapshot of the patch write destination (for example #V00) to the master volume #M0 (a step S2005).

A step S2006 is performed for each of the clients that was the destination of a query as to whether or not updating is to be performed.

In this step S2006, the WSS control program 425 decides whether or not the response from the client "YES".

If the response from a client (for example #1) is "YES" (YES in the step S2006), then the WSS control program 425' performs resynching from the master volume #M0 after restoration to the snapshot (for example #V01) corresponding to the VM (for example #1) that is coupled to the client that issued the "YES" response (a step S2007).

But, if the response from a client (for example #2) is "NO" (NO in the step S2006), then the WSS control program 425' does not perform the step S2007. It should be understood that, instead of this, it would also be acceptable for the WSS control program 425' to establish one-to-one correspondence of all of the pool blocks of the backup destination of the guest OS image from the master volume #M0, to all of the snap blocks that make up the snapshot corresponding to the VM that is coupled to the client that issued the "NO" response.

FIG. 21 shows recovery processing according to the second embodiment.

When returning some snapshot (for example #V00) to the original state (i.e. when recovering data), before restoring to the master volume #M0, the storage device 185 performs resynching from the master volume #0 to the snapshot #V00.

By the above, according to this second embodiment, when a patch is written to a snapshot volume, the master volume is restored, and resynching is performed from the master volume after restoration to other snapshot volumes. By doing this, it is possible to reduce the possibility of a plurality of copies of the same patch being stored in the differential pool 195.

While several embodiments of the present invention have been explained above, the present invention should not be considered as being limited by these embodiments; it goes without saying that various changes to the present invention are possible, provided that its central concept is not deviated from.

For example, it would also be possible for a PDEV upon which the DP pool or the differential pool is based to be among other storage devices that are coupled to the storage device. In this case, the storage system would include a plurality of storage devices.

Furthermore, for example, it would also be acceptable for a VM to issue a response to the storage device as to whether or not updating is to be performed, without any query to the client as to whether or not to perform updating.

Moreover, for example, it would also be possible for the management computer to be coupled to the host, and for the storage device to receive the response as to whether or not updating is to be performed from the host via the management computer.

REFERENCE SIGNS LIST

105 . . . storage device

The invention claimed is:

1. A storage system, comprising:
a plurality of physical storage devices upon which is based a pool, that is a storage region made up from a plurality of physical regions; and
a controller coupled to a plurality of computers and to said plurality of physical storage devices;
wherein a common electronic object is used by said plurality of computers; said controller supplies to said plurality of computers a plurality of duplicate volumes, that are a plurality of virtual volumes corresponding to duplicates of a master volume, that is a virtual volume in which said electronic object is stored; each virtual volume is a virtual logical volume that follows sync provisioning, and comprises a plurality of virtual regions; in said plurality of duplicate volumes, a plurality of physical regions that are allocated to said master volume are allocated, and that plurality of physical regions store said electronic object that is stored in said master volume; said plurality of computers comprise a first computer and a second computer; a first duplicate volume is supplied to said first computer, and a second duplicate volume is supplied to said second computer;
wherein said controller is configured to:
(A) receive, from said first computer, a write command in which is specified a write destination address in said first duplicate volume, that is a command in which an electronic module that is applied to the electronic object used by said first computer is specified as being the write subject;
(B) copy, to a second physical region within said pool, data within a first physical region that is allocated to a virtual region of the write destination to which said write destination address belongs, write said electronic module to said second physical region, and allocate said second region to a virtual region of said write destination, instead of said first physical region;
(C) allocate said second physical region to a virtual region within said second duplicate volume corresponding to a virtual region of said write destination, instead of the physical region that is allocated to that virtual region;
(F) for a first master volume, decide whether or not the duplicate volume load is high; and
(G) when the result of said decision (F) is affirmative, perform the processing described below:
(g1) copying data in a first physical region allocated in said first master volume, to a third physical region;
(g2) creating a second master volume to which said third physical region is allocated; and
(g3) creating a duplicate of said second master volume, in which said third physical region is allocated.

2. A storage system according to claim 1, wherein said controller is further configured to perform said (C) when a response has been received to the effect that updating of said electronic object used by said second computer is to be performed.

3. A storage system according to claim 2, wherein said controller is further configured to not perform said (C) when a response has been received to the effect that updating of said electronic object used by said second computer is not to be performed.

4. A storage system according to claim 3, wherein said controller is further configured to allocate said second region to a virtual region in said master volume corresponding to the virtual region of said write destination, instead of to said first physical region that is allocated to that virtual region.

5. A storage system according to claim 4,
wherein each computer is a virtual computer executed by a physical computer,
wherein said electronic object is an operating system (OS) executed by a virtual computer, and
wherein said electronic module is a patch to said OS.

6. A storage system according to claim 1,
wherein said controller is further configured to hold mapping management information that is information specifying, for each virtual volume, an allocation relationship between virtual regions and physical regions; said mapping management information comprises information specifying, for each virtual region in which said electronic object is stored, a physical region that was allocated in the past; and
wherein said controller is configured to allocate, in some duplicate volume, a physical region that was allocated in the past, specified from said mapping management information, to each virtual region in which said virtual object is stored.

7. A storage system according to claim 1, wherein, in said (F), it is decided whether or not the condition (f1) or the condition (f2) described below is satisfied:
(f1) when a duplicate of said first master volume is added, the number of duplicates of said first master volume will exceed a predetermined number; and
(f2) whether the performance of one or more duplicates of said first master volume is lower than some predetermined performance.

8. A storage system according to claim 1,
wherein a plurality of master volumes are classified according to a master volume attribute;
wherein said controller is configured to:
receive a command to consider some duplicate of some master volume as a duplicate of said first master volume, and, upon receipt of this command, and
perform said (F), with the duplicate volume created by said (g3) being said some duplicate volume.

9. A storage system according to claim 8, wherein said first master volume has a master volume attribute that matches a master volume attribute designated by said command.

10. A storage system, comprising:
a plurality of physical storage devices upon which is based a pool, that is a storage region made up from a master volume, that is a logical volume upon which an electronic object that is in common to a plurality of computers is stored, and a plurality of physical regions; and a controller coupled to the plurality of computers and to said plurality of physical storage devices;

wherein said controller supplies to said plurality of computers a plurality of duplicate volumes, that are a plurality of logical volumes corresponding to snapshots of said master volume; each logic region making up each duplicate volume corresponds to a physical region that makes up said master volume; said plurality of computers comprise a first computer and a second computer; a first duplicate volume is supplied to said first computer, and a second duplicate volume is supplied to said second computer;

said controller is configured to:
- (A) receive from said first computer a write command in which is specified a write destination address in said first duplicate volume, that is a command in which an electronic module that is applied to the electronic object used by said first computer is specified as being the write subject;
- (B) write said electronic module to a physical region within said pool, allocate the physical region in which said electronic region is written to a logic region of the write destination to which the write destination address belongs, and establish a correspondence to this logic region, instead of to the physical region within said master volume;
- (C) copy at least said electronic module from said first duplicate volume to said master volume, and write updated data in said master volume from said master volume to said pool; and
- (D) consider said second duplicate volume as a duplicate of the master volume after said (C) has been performed.

11. A storage system according to claim 10, wherein said controller is further configured to execute said D when a response has been received to perform updating of said electronic object used by said second computer.

* * * * *

UNITED STATES PATENT AND TRADEMARK OFFICE
CERTIFICATE OF CORRECTION

| | | |
|---|---|---|
| PATENT NO. | : 8,566,541 B2 | Page 1 of 1 |
| APPLICATION NO. | : 12/935886 | |
| DATED | : October 22, 2013 | |
| INVENTOR(S) | : Jin Choi, Ikuya Yagisawa and Koji Nagata | |

It is certified that error appears in the above-identified patent and that said Letters Patent is hereby corrected as shown below:

Title Page

Item (22) PCT Filed: "Aug. 14, 2010" should be changed to --Sep. 14, 2010--

Signed and Sealed this
Twenty-fifth Day of February, 2014

Michelle K. Lee
*Deputy Director of the United States Patent and Trademark Office*